United States Patent
Nao et al.

(10) Patent No.: US 11,571,848 B2
(45) Date of Patent: Feb. 7, 2023

(54) METHOD, APPARATUS AND SYSTEM FOR ATTACHING A LABEL ON A PRODUCT

(71) Applicant: Fuji Seal International, Inc., Osaka (JP)

(72) Inventors: Yoshida Nao, Eindhoven (NL); Lucas Van Rijsewijk, Boxtel (NL); Frederik Gerardus Heeman, Venlo (NL); Joop Peeters, Kessel (NL)

(73) Assignee: Fuji Seal International, Inc., Osaka (JP)

( * ) Notice: Subject to any disclaimer, the term of this patent is extended or adjusted under 35 U.S.C. 154(b) by 0 days.

(21) Appl. No.: 16/307,433

(22) PCT Filed: Jun. 9, 2017

(86) PCT No.: PCT/NL2017/050383
§ 371 (c)(1),
(2) Date: Dec. 5, 2018

(87) PCT Pub. No.: WO2017/213506
PCT Pub. Date: Dec. 14, 2017

(65) Prior Publication Data
US 2019/0256236 A1    Aug. 22, 2019

(30) Foreign Application Priority Data
Jun. 10, 2016  (NL) .................................. 2016934

(51) Int. Cl.
*B65B 53/02*  (2006.01)
*B29C 63/42*  (2006.01)
(Continued)

(52) U.S. Cl.
CPC .............. *B29C 63/42* (2013.01); *B29C 65/66* (2013.01); *B32B 7/12* (2013.01); *B32B 27/08* (2013.01);
(Continued)

(58) Field of Classification Search
CPC ................................ B29C 63/42; B65B 53/00
See application file for complete search history.

(56) References Cited

U.S. PATENT DOCUMENTS 4,325,762 A * 4/1982 Burmeister ........... B29C 63/423
156/272.2
9,056,959 B2   6/2015 Inaoka et al.
(Continued)

FOREIGN PATENT DOCUMENTS

DE    102013007411 A1   10/2014
JP        60036133 A    2/1985
(Continued)

OTHER PUBLICATIONS

"International Application Serial No. PCT/NL2017/050383, International Search Report dated Jul. 28, 2017", (Jul. 28, 2017), 5 pgs.
(Continued)

*Primary Examiner* — Philip C Tucker
*Assistant Examiner* — John Blades
(74) *Attorney, Agent, or Firm* — Schwegman Lundberg & Woessner, P.A.

(57) ABSTRACT

The present disclosure relates to a method of attaching a shrinkable label (22) on a product (23) wherein the shrinkable label comprises a multi-layered film (1, 10) comprising a heat shrinkable material and a photothermic material (3, 4, 14), the method comprising: —transporting the at least one product on a conveyor (65); —arranging the at least one product in an irradiation volume, the irradiation volume being defined by a plurality of LED UV light emitters (63) arranged to emit UV-light in the direction of at least a shrinkable label arranged around the at least one product; —controlling the UV-light emitters to irradiate the at least one shrinkable label arranged around the one or more products in the irradiation volume in order for the photo-
(Continued)

thermic material to heat up causing the heat shrinkable material to shrink around the at least one product.

22 Claims, 20 Drawing Sheets

(51) Int. Cl.
| | | |
|---|---|---|
| *B65D 23/08* | (2006.01) | |
| *B65D 25/36* | (2006.01) | |
| *B32B 27/08* | (2006.01) | |
| *B32B 27/30* | (2006.01) | |
| *B32B 27/36* | (2006.01) | |
| *B32B 7/12* | (2006.01) | |
| *B29C 65/66* | (2006.01) | |

(52) U.S. Cl.
CPC ............ *B32B 27/302* (2013.01); *B32B 27/36* (2013.01); *B65B 53/02* (2013.01); *B65D 23/0878* (2013.01); *B65D 25/36* (2013.01); *B32B 2250/03* (2013.01); *B32B 2250/05* (2013.01); *B32B 2250/24* (2013.01); *B32B 2307/412* (2013.01); *B32B 2307/71* (2013.01); *B32B 2307/736* (2013.01); *B32B 2519/00* (2013.01)

(56) References Cited

U.S. PATENT DOCUMENTS

| | | |
|---|---|---|
| 2005/0142313 A1 | 6/2005 | Grah |
| 2006/0138387 A1 | 6/2006 | Fan et al. |
| 2006/0275564 A1 | 12/2006 | Grah et al. |
| 2007/0235689 A1 | 10/2007 | Marking et al. |
| 2008/0148691 A1* | 6/2008 | Elsperger ............... B65B 53/066 53/442 |
| 2011/0126960 A1* | 6/2011 | Orlandi .................. B65C 3/065 156/84 |
| 2013/0123380 A1 | 5/2013 | Sumitani et al. |

FOREIGN PATENT DOCUMENTS

| | | |
|---|---|---|
| JP | 6162806 U | 4/1986 |
| JP | 07195018 A | 8/1995 |
| JP | 8215627 A | 1/1999 |
| JP | 2007120926 A | 5/2007 |
| JP | 2008150063 A | 7/2008 |
| JP | 2008155998 A | 7/2008 |
| JP | 2009213561 A | 9/2009 |
| JP | 2010070247 A | 4/2010 |
| JP | 2014005475 A | 1/2014 |
| JP | 2014084139 A | 5/2014 |
| WO | WO-2011031160 A1 | 3/2011 |
| WO | WO-2011145550 A1 | 11/2011 |
| WO | WO-2013073938 A1 | 5/2013 |
| WO | WO-2014006033 A1 | 1/2014 |
| WO | WO-2016193121 A1 | 12/2016 |

OTHER PUBLICATIONS

"International Application Serial No. PCT/NL2017/050383, Written Opinion dated Jul. 28, 2017", (Jul. 28, 2017), 7 pgs.

"Japanese Application Serial No. 2018-561632, Notice of Refusal dated Feb. 4, 2020", w/English Translation, (Feb. 4, 2020), 14 pgs.

"Japanese Application Serial No. 2018-561632, Office Action dated Jun. 2, 2020", w/ English Translation, (dated Jun. 2, 2020), 20 pgs

* cited by examiner

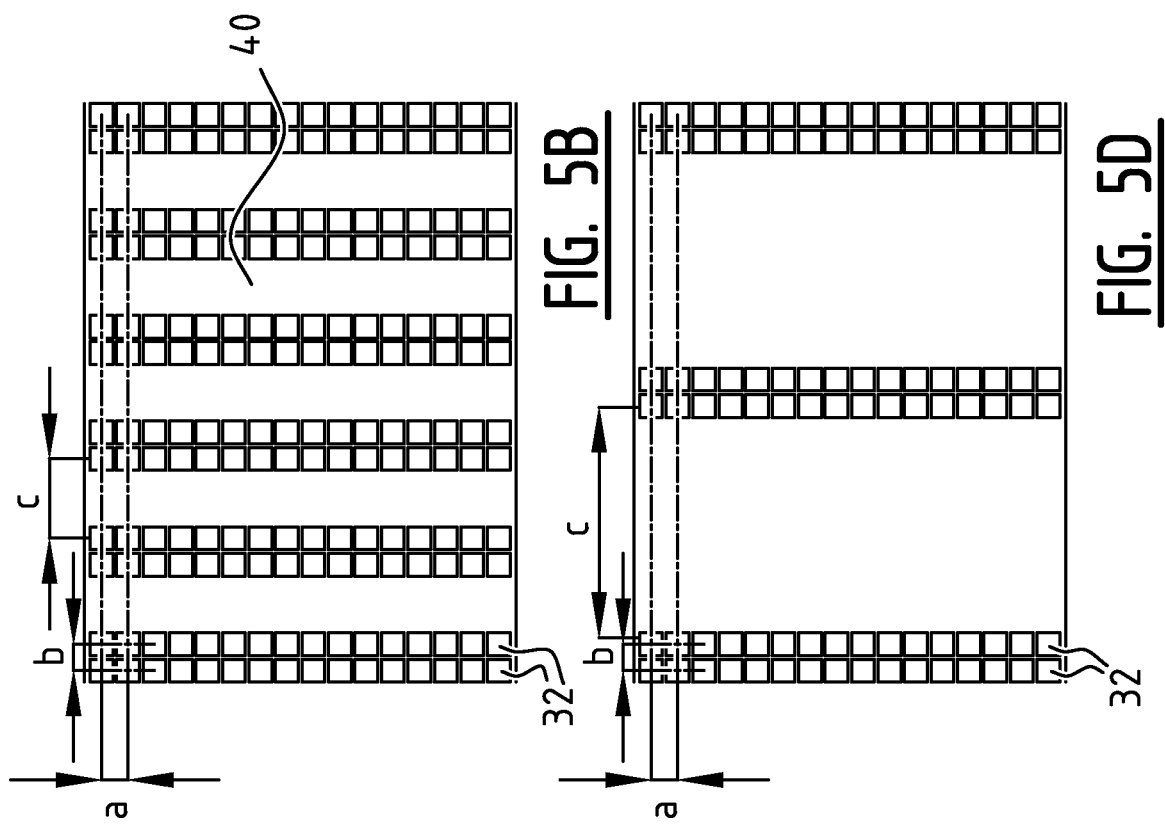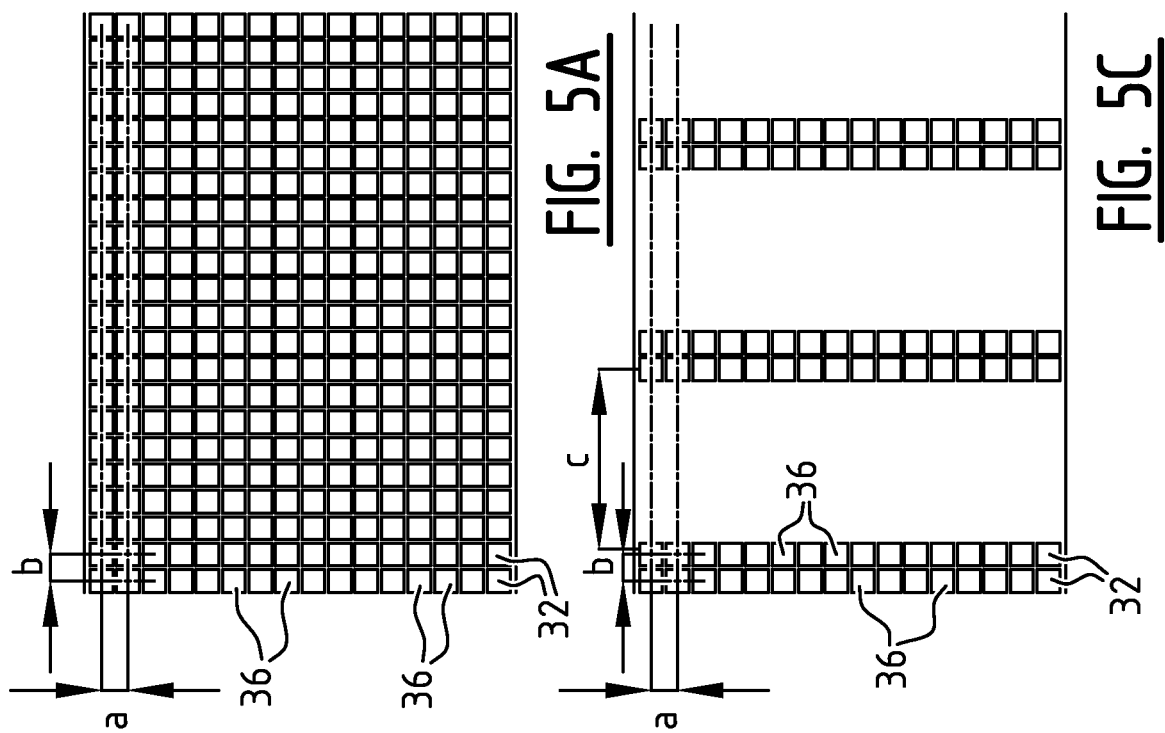

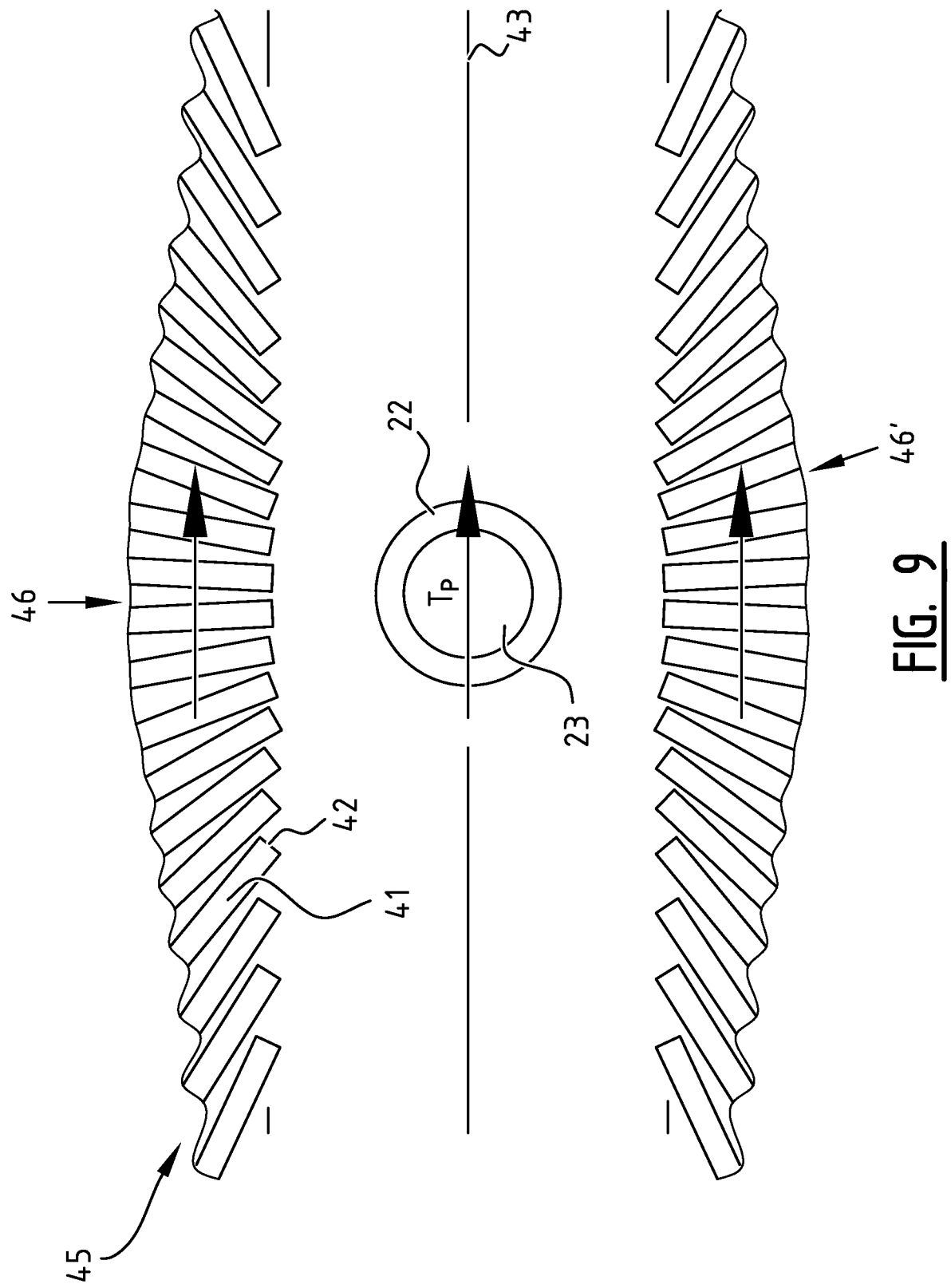

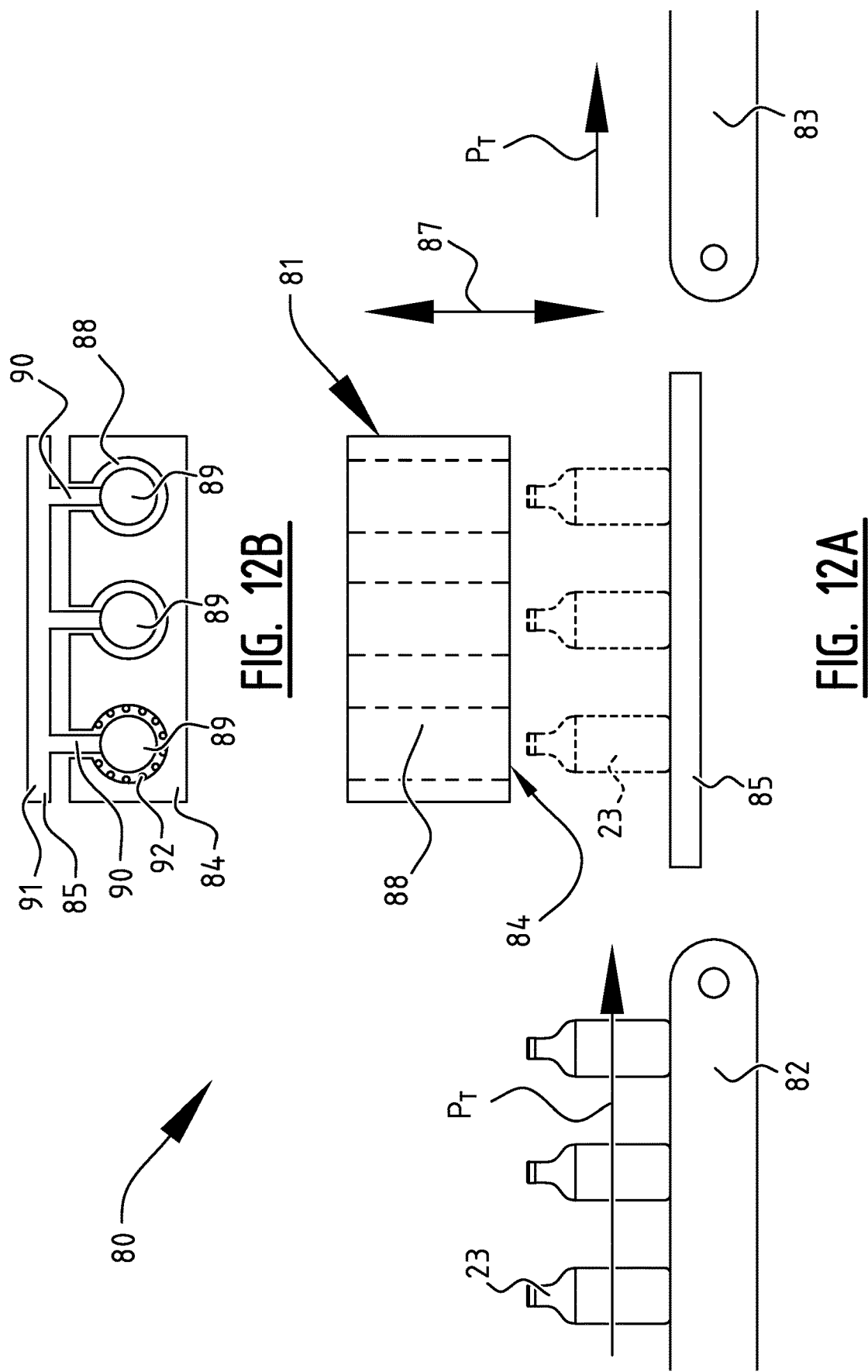

METHOD, APPARATUS AND SYSTEM FOR ATTACHING A LABEL ON A PRODUCT

PRIORITY APPLICATIONS

This application is a U.S. National Stage Filing under 35 U.S.C. 371 from International Application No. PCT/NL2017/050383, filed on Jun. 9, 2017, and published as WO2017/213506 on Dec. 14, 2017, which claims the benefit of priority to Netherlands Application No. 2016934, filed on Jun. 10, 2016; the benefit of priority of each of which is hereby claimed herein, and which applications and publication are hereby incorporated herein by reference in their entirety.

The present disclosure relates to a method, apparatus and system for attaching a shrinkable label on a product wherein the shrinkable label comprises a multi-layered film comprising heat shrinkable material and photothermic material.

Sleeving systems have been developed for efficiently attaching sleeve-like labels on products, such as containers (for instance food containers, bottles, jars, bowls, holders, etc.). Examples of such sleeving systems are described in WO 2011031160 A1, WO 2013/073938 A1 and WO 2014/006033 A1. These sleeving systems are aimed at arranging sleeves (labels) around products by feeding a continuous strip of flattened tubular heat-shrinkable label material towards a spreading element, transporting the tubular label material along the outer surface of the spreading element so as to open the label material, cutting the label material to form sleeve-shaped labels and discharging the labels from the spreading element towards a row of products passing on a conveyor below or above the spreading element. In other examples the tubular label material is cut to form sleeves before the tubular label material is opened. The labels are arranged more or less loosely around each of the products and subsequently attached to the product by guiding the products through an oven. The labels are made of heat-shrinkable material and carrying the product through the hot air and/or steam generated in the oven causes the label to shrink and to thereby get firmly attached to the product.

A drawback of using hot steam and/or hot air to activate the shrinkable label material in order to shrink the label onto the products is that the hot air and/or steam may undesirably heat or even damage the substance contained within the product. Furthermore, labels shrunk using hot steam and/or air often do not conform completely to all of the contours of the product, especially if the product has a complex shape.

It is known as such to use UV light to activate the shrinking of the shrinkable label material. In this case the shrinkable label is still made of heat shrinkable material, but the heat is generated inside of the label instead of being applied from the outside because the label material is able to absorb the UV light and convert the absorbed UV light into thermal energy. Consequently, the label material absorbing the UV light is heated up which causes the label to contract.

However, the UV light sources typically used are pulsed, gas-filled flash lamps or spark-gap discharge devices. These UV light sources are expensive, bulky, generate a lot of heat and tend to have a limited lifetime. Additionally, the shrink quality that can be achieved with these types of light sources may be relatively poor and/or it has been proven difficult to attach the labels on products on an industrial scale and/or in a sufficiently fast and reliable manner.

It is clear that there is a need to obtain an improved method and system for activating the shrink characteristics of a label and/or for properly attaching labels to a plurality of products.

It may be an object to provide a method and system of attaching labels to products wherein the above-mentioned and/or other drawbacks of existing methods and systems have been reduced.

According to a first aspect a method of attaching a shrinkable label on a product is provided wherein the shrinkable label comprises a multi-layered film comprising heat shrinkable material and photothermic material, the method comprising:

transporting the at least one product on a conveyor;
arranging the at least one product with a shrinkable label in an irradiation volume, the irradiation volume being defined by a plurality of UV light emitters arranged to emit UV-light in the direction of at least a shrinkable label arranged around the at least one product;
controlling the UV-light emitters to irradiate the at least one shrinkable label arranged around the one or more products in the irradiation volume in order for the photothermic material to heat up causing the heat shrinkable material to shrink around the at least one product;
wherein the UV light has a peak wavelength between 200 and 399 nm and at least 90% of the UV light is within a bandwidth of +/−60 nm of the peak wavelength.

Good attachment results may be achieved when the method and system involve the use of ultraviolet (UV) light having a peak wavelength between 200 and 399 nm, for instance between 300 nm and 395 nm or between 350 nm and 390 nm, while at least 90% of the UV light is within a bandwidth of +/−60 nm of the peak wavelength, and preferably between +/−30 nm of the peak wavelength. For example, the peak wavelength may be 365 nm, 385 nm or 395 nm.

The claimed range(s) enable(s) good shrink results, for instance a label that has been evenly shrunk around the product. Furthermore the range provides a reduced color influence of the printed label material. In other words, the claimed wavelength range avoids or at least reduces the influence on the shrink result of label material that provides the label with the required (visual) color effect. Therefore a more even shrink result may be achieved.

Another disadvantage of the above-mentioned typical UV light sources is that these source may be detrimental to the safety of the environment. For instance, the light emitted by these typical UV light sources may contain short-wavelength ultraviolet light (UVC) which may be harmful to the content with which the products are filled and/or to the human operator. The harmful part of the radiation may be filtered out by a separate filtering unit, but the filtering unit makes the device more complex. Furthermore, harmful gasses such as ozone may be generated which gasses need to be discharged. The means for discharging these gasses make the device more complex and expensive. Therefore, according to a further aspect, the UV light emitters are LED UV light emitters.

By making use of a plurality of LED UV light emitters arranged to define an irradiation volume wherein the products may be transported, a relatively low cost and/or compact arrangement can be realized for a fast and reliable attachment of the labels to the products. The products and irradiation volume may be arranged to (continuously or intermittently) move relative to each other. This relative movement may be achieved by moving the products relative to a stationary irradiation volume, by moving the irradiation volume relative to a stationary product and/or by moving both the irradiation volume and the product, as will be explained hereafter. Furthermore, while the irradiation volume and hence the UV light emitters may be kept stationary during the irradiation of a product, the radiation beam (s) generated by the UV light emitters may be caused to move during irradiation, for instance by means of movable reflectors and/or lenses. In specific embodiments the method comprises transporting the at least one product on a conveyor and irradiating the at least one product while the product is being transported by the conveyor.

Furthermore, in embodiments of the present disclosure, the conveyor may be configured to rotate the product inside the irradiation volume during the irradiation by the UV light emitters and/or the UV emitter support may be configured to rotate the support and thereby the irradiation volume. During the rotation the products may continue to be transported in the direction of transport of the conveyor or may be temporarily halted. The rotation of the UV emitter support and/or the products may be assist in irradiating essentially the entire outer surface of the label to the UV light from the UV light emitters or even to provide a substantially uniform distribution of UV light across the label and thereby to increase the attachment result.

As mentioned above the products and irradiation volume formed by the UV light emitters may be arranged to continuously or intermittently move relative to each other. For instance, the conveyor may transport the products intermittently and the irradiation may be performed in the time intervals in which the products are stopped. In other embodiments the products are transported continuously and the irradiation is performed during movement of the products.

In specific embodiments the supports may be embodied as two half-cup-shaped supports arranged at either side of the trajectory of the products on the conveyor. The UV emitters arranged over the curved inner surface of each of the half-cup-shaped supports. The method may involve:

moving one or more UV light emitter supports comprising a plurality of UV light emitters in a direction perpendicular to the trajectory of the products on the conveyor so as to position the UV light emitters in a predetermined range from the products being transported;

irradiating the one or more sleeve-shaped labels arranged around the one or more products so as to shrink the labels around the one or more products;

moving the one or more UV light emitter supports away from the trajectory.

When the products are transported intermittently, the movement of the UV light emitter supports is performed in a time interval when the transport of the product has been interrupted. When the products are transmitted continuously, the method may involve:

continuously transporting products on a conveyor in a transport direction;

transporting one or more a UV light emitter supports from a start position in a direction parallel to the transport direction and synchronously with the products being transported;

moving the one or more UV light emitter supports towards the one or more products in a direction perpendicular to the transport direction so as to position the UV light emitters in a predetermined range from the products being transported;

irradiating the one or more sleeve-shaped labels arranged around the one or more products so as to shrink the labels around the one or more products;

moving the one or more UV light emitter supports away from each other; and transporting the UV light emitter supports back to the start position.

The above operations are repeated for successive further batches of one or more products. In this manner a plurality of labels may be synchronously attached to a plurality of products and therefore the speed and/or quality of the attachment operation can be increased.

In some specific embodiments the irradiation volume may be pocket formed by one or more walls at least partially surrounding the one or more product. The pocket may be a cylindrical pocket when the UV emitters are mounted in a (at least partially) cylindrical wall (wherein the cylinder may have a circular or oval cross-section). The pocket may also take the shape of a rectangular block when the UV emitters are mounted in two straight walls extending parallel to the direction of transport of the products. The UV emitters may also be mounted to one or more curved or arched walls, as will be explained hereafter.

The labels may be fully attached to the products or only partially, depending on the application. For instance, when the label is used for tamper evidence purposes, the attachment may be partial only (partial in the sense that the label is only locally shrunk. This local attachment may be sufficient for the purpose of a tamper evidence) and/or may be a low-quality attachment. Furthermore, the label may be a full label or a partial label.

A suitable irradiation may be achieved when the UV light emitters are arranged to direct UV light substantially transversely of the label surface so that an even distribution of the light intensity over the label may be easily achieved.

In order to illuminate the label on a product from essentially all directions the UV light emitters may be arranged in a substantially cylindrical pattern at least partly surrounding the irradiation volume. A further benefit of the use of a cylindrical pattern is that the pattern can be the same for products and/or labels of different sizes. The required illumination power of the emitters may be kept relatively low.

In other embodiments the UV light emitters may be arranged in a pattern essentially parallel to the transport direction of the at least one product on the conveyor. The pattern may form a flat or curved wall that is located alongside the conveyor on which the products are conveyed. In embodiments wherein the UV lights are positioned at one side of the conveyor only, the products may need to be rotated during the illumination in order to attach the label. In other embodiments wherein the UV lights are positioned at both sides of the conveyor, the products may be illuminated without the need to rotate the products during the illumination (although also in this case the products may be mounted to the conveyor so as to rotate the products at the same time as they are transported along the UV emitters).

The UV light emitters may have been arranged to focus UV light on a focus area. The conveyor may be arranged to move consecutive products to and from the focus area to expose the products to a suitable dose of UV light (i.e. a suitable light intensity during a suitable time interval). The focusing of the UV light may involve directing UV light in a direction transversely of the transport direction of the at least one product, for instance in embodiments wherein the UV light emitters are arranged in a cylindrical arrangement and the products are transported in axial direction through the cylindrical arrangement or embodiments wherein the products are transported between two opposing flat walls of UV light emitters. In other embodiments the UV light may also be directed in oblique directions and/or parallel directions relative to the transport direction.

In embodiments the method may further comprise:
arranging the at least one product in the irradiation volume;

arranging at least one label on the at least one product arranged inside the irradiation volume;

irradiating the label with UV light from the UV light emitters to attach the label to the at least one product.

In these embodiments a product is arranged inside the irradiation volume before a label is arranged around the product. Only when the product has arrived in the irradiation volume, the label is arranged around the product, for instance by sliding a sleeve-like label over the product. The UV emitters may then be activated to start irradiating the label.

In other embodiments the method comprises arranging a product in the irradiation volume that already has been provided by a label. The product is, in other words, pre-sleeved before it enters the irradiation volume. The irradiation in the irradiation volume then may actually attach the label to the product.

In still other embodiments at least one label, for instance a sleeve-like label in its opened state, is arranged in the irradiation volume. Once the label has been arranged in the irradiation volume, at least one product is arranged in the irradiation volume in such a manner that the label gets arranged on the at least one product. For example, this may be achieved by sliding the product inside the above-mentioned sleeve-like label in its opened position. Additionally or alternatively, this can be achieved with a dummy element. The sleeve is arranged on the dummy element provided in the irradiation volume. The dummy element may be a tube, for instance a cylindrical tube, having a relatively stiff wall. The diameter of the tube is slightly larger than the diameter of the product so that the product can be easily slid inside the tube. Once the product has been moved into the dummy element, the dummy element may be removed, leaving the label to be (loosely) arranged around the product, ready for being attached to the product by irradiating the label with UV light.

The label and/or the product may be preheated before and/or after the label is being applied around the product (but before the label is attached to the product) so as to support the subsequent heat-shrinking operation. For instance, if the label arranged around the product is warmed up, a lower radiation dose (i.e. lower light intensity and/or shorter irradiation time interval) may be sufficient to firmly attach the label to the product. The preheating may involve heating the label to attain a temperature of at least 10 degrees Celsius below the shrinking temperature of the label material. For instance, the labels may be heated to a temperature of 50-70 degrees Celsius, before the labels are irradiated with UV light. In other embodiments also the wall of the product may be heated to some extent in order to achieve the same effect.

According to a second aspect of the present disclosure an apparatus for attaching a shrinkable label on a product is provided wherein the shrinkable label comprises a multi-layered film comprising heat shrinkable material and photothermic material, the apparatus comprising:

a plurality of UV light emitters;

at least one UV light emitter configured to support the UV light emitters, the UV light emitter support being shaped to form an irradiation volume in which one or more products can be arranged;

a controller configured to control the UV-light emitters to irradiate the one or more shrinkable labels arranged on the one or more products in the irradiation volume in order for the photothermic material to heat up causing the heat shrinkable material to shrink around the one or more products.

The UV light emitters may be configured to emit UV light having a peak wavelength between 200 and 399 nm, wherein at least 90% of the UV light is within a bandwidth of +/−60 nm of the peak wavelength, and preferably between +/−30 nm of the peak wavelength. As mentioned earlier, this range of wavelengths helps obtaining good shrink results.

In case of the use of LED's as UV light emitters it would be possible to realize a compact design of the apparatus wherein a relatively low amount of heat is generated during the irradiation. Furthermore, the light emitted by the LED UV light emitter may provide light in a frequency range without the above-mentioned harmful UVC radiation and therefore the use of LED UV lights may be less harmful to the environment.

The at least one UV light emitter support may comprise a substantially cylindrical frame at least partly surrounding the irradiation volume. The UV light emitters may be arranged in a cylindrical pattern, for instance by mounting the emitters in the cylindrical frame. The UV light emitter support may also be configured to support the UV light emitters in a substantially flat or slightly curved frame or wall. More specifically, the UV light emitters may be mounted in one or more frames forming two straight walls extending parallel to a conveyor. The UV emitters may also be mounted to one or more curved or arched walls.

According to a third aspect a system for attachment of a label to a product is provided. The system comprises one or more of the apparatus as described herein and one or more conveyors for transporting the products. The conveyor may be any type of conveyor that is able to convey (transport) one or more products, preferably one or more rows of products, into the irradiation volume and out of the irradiation volume. For instance, the conveyor may comprise an endless transport belt driven by one or more electric motors. The conveyor may be embodied to carry the products in a fixed or variable orientation.

The apparatus may further comprise a rotation unit configured to rotate a product when the product is arranged in the irradiation volume. For instance, the rotation unit may be integrated with the conveyor so that the products may both be transported into and out of the irradiation volume while being rotated. The rotation unit may even be configured to rotate the product during irradiation. In this manner essentially the entire outer surface of the label to the UV light from the UV light emitters may be illuminated.

The plurality of UV emitters may be positioned in a pattern comprising a number of (straight) rows and columns, the columns extending generally parallel to the axial direction of the product. The UV emitters of a row or a column may be mounted on an elongated strip. In further embodiments the UV light emitter support comprises a plurality of strips, each strip comprising one or more columns of UV light emitters. The strips of UV light emitters may be arranged in an abutting manner In other embodiments the strips are arranged a distance relative to each other. The distance between neighboring strips (also referred to as the clearance between the strips) may be between two times and eight times the width of the strips. In this manner a reduction may be realized of the amount of heat generated during the irradiation (relative to the amount of heat generated when all rows of UV emitters are arranged in an abutting manner across the surface of the emitter support facing the focus area) and in the amount of UV light emitters used to irradiate the labels, while still a relatively even distribution of the irradiated light may be achieved.

In an embodiment the conveyor, UV light emitter and controller are configured to:

a) move the products past a plurality of stationary UV light emitters;

b) move UV light emitters past a plurality of stationary products; or c) move the UV light emitters and the products.

In embodiments of the present disclosure the UV light emitter support is configured to support the UV light emitters in an arrangement that causes the UV light emitters to emit UV light in a direction transversely of the transport direction of the at least one product and/or to support the UV light emitters in an arrangement that cause the UV light emitters to focus UV light on a focus area.

The apparatus may comprise a sleeving device for applying sleeve-like labels on the products. For instance, a sleeving device may be a device as described in any of the previous applications WO 2011031160 A1, WO 2013/073938 A1 and WO 2014/006033 A1, their content being herein incorporated by reference. Other methods and devices for applying sleeves to the products may be employed as well.

According to an exemplifying example the one or more UV light emitter supports may be mounted to be movable in a direction perpendicular to the trajectory of the products on the conveyor, the apparatus further comprising a drive unit for driving the movement of the UV light emitter support. The apparatus may further be configured to:

move the one or more UV light emitter supports towards the trajectory so as to position the UV light emitters in a predetermined range from products being transported;

irradiate the one or more sleeve-shaped labels arranged around the one or more products so as to shrink the labels around the one or more products;

move the one or more UV light emitter supports away from the trajectory.

In another embodiment the one or more UV light emitter supports are mounted to be movable in a first direction parallel to the trajectory of the products on the conveyor and a second direction perpendicular to the trajectory of the products on the conveyor, the apparatus further comprising a drive unit for driving the movement of the UV light emitter support, the apparatus further being configured to:

transport the one or more a UV light emitter supports from a start position in the first direction, synchronously with the products being transported;

move the one or more UV light emitter supports in the second direction towards the one or more products so as to position the UV light emitters in a predetermined range from the products being transported;

irradiate the one or more sleeve-shaped labels arranged around the one or more products so as to shrink the labels around the one or more products;

move the one or more UV light emitter supports away from the trajectory; and transport the one or more UV light emitter supports back to the start position.

In a further embodiment the apparatus comprises two UV light emitter supports arranged at either side of the trajectory of the products on the conveyor, wherein each of the UV light emitter supports comprises one or more half-cup-shaped elements, wherein each half-cup-shaped element comprises a curved inner surface provided with UV light emitters.

In a further embodiment the apparatus comprises a preheating unit configured to preheat the products before the irradiation with UV light. Preheating the label may reduce the amount of light needed to shrink the labels around the products. Therefore preheating may be helpful to reduce irradiation dosage. This reduction of the amount of light may reduce the attachment time and thereby the "takt" time of the apparatus. The light dose reduction decreases the amount of heat that is generated by the illumination process. Preferably the preheating unit is arranged outside of the irradiation volume. The preheating unit may be configured to heat the label material to a temperature of at least 10 degrees Celsius below the shrinking temperature and/or to a temperature of 50-70 degrees Celsius.

Further characteristics of the present invention will be elucidated in the accompanying description of various preferred embodiments thereof. In the description reference is made to the annexed figures.

FIGS. 5A-5D are side views of various embodiments of an array of UV-LED light emitters of an attachment apparatus for attaching a label on a product;

FIG. 6-9 are schematic top views of respective further embodiments of an attachment apparatus;

FIGS. 10A-10E show a conveyor and a part of a further embodiment of an attachment apparatus, wherein FIGS. 10A-10E show the conveyor with attachment apparatus in various stages of the attachment operation;

FIGS. 12A-12B are a schematic side view and top view of a (part of) an attachment system according to a further embodiment;

Unless defined otherwise, all technical terms used herein have the same meaning as commonly understood by one of ordinary skill in the art to which this invention belongs. Still, certain elements are defined below for the sake of clarity and ease of reference. Furthermore it is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope of the present invention. Any recited method can be carried out in the order of events recited or in any other order which is logically possible.

Figure 1A:
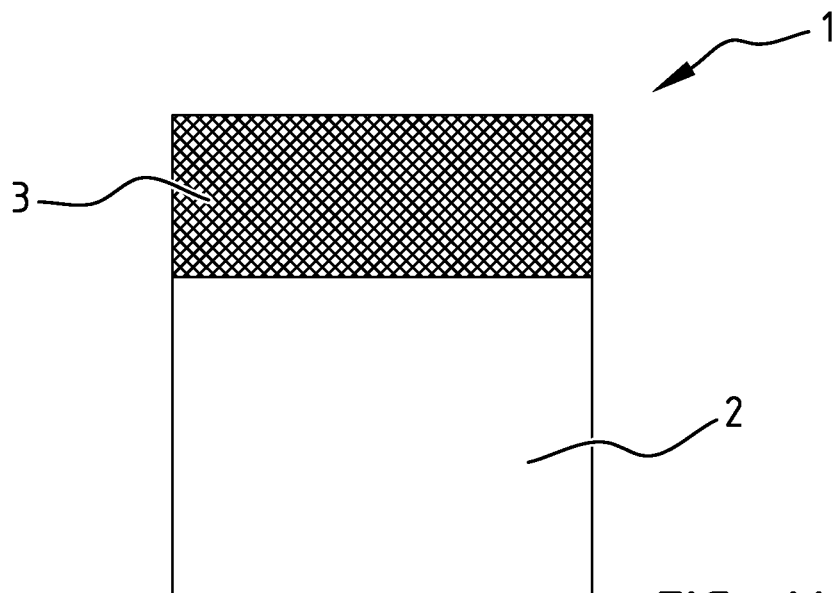
FIG. 1A is a schematic view of a cross-section through a first embodiment of a multi-layered film.
Figure 1B:
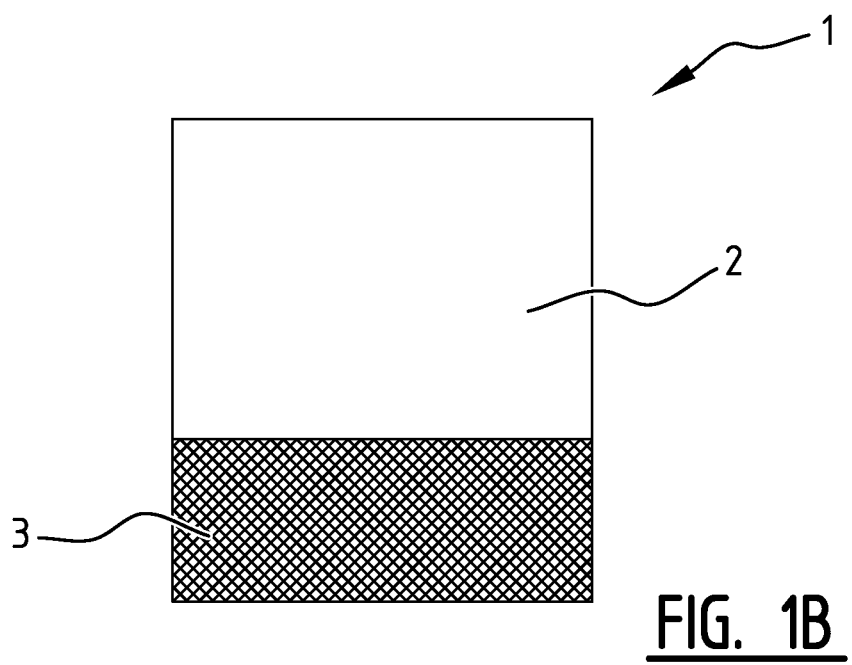
FIG. 1B is a schematic view of a cross-section through a second embodiment of a multi-layered film.

Referring to FIGS. 1A-1G several embodiments of heat shrinkable multi-layered films to be attached to a product, such as—but not limited to—containers, bottles, receptacles, holders for holding a variety types of foodstuff or non-foodstuff materials, etc. are presented. In the embodiments of FIGS. 1A and 1B, the multi-layered film 1 comprises a base layer film 2 and a photothermic layer 3. The photothermic layer 3 is made of material that causes the generation of thermal energy (heat) when the material is irradiated with electromagnetic radiation, such as light, for instance ultraviolet light (UV light). More specifically, the electromagnetic radiation produces the photoexcitation of the material, resulting in the production of thermal energy (heat).

The layer 3 may also be a combined photothermic and design layer. FIG. 1A shows a combined photothermic and design layer 3 that has been printed on top of the base layer film 2, whereas in FIG. 1B the combined photothermic and design layer 3 has been printed below the base layer film 2. In FIGS. 1A-1G, a bottom or lower side of the film 1 is defined as a side of the film that faces or touches the outer surface of the product when applied onto said product, whereas a top or upper side of the film relates to a side of the film that faces the source of electromagnetic radiation when the layer is irradiated.

In FIG. 1A, the combined photothermic and design layer 3 may be formed from a transparent lacquer. As well as having good UV absorption properties, this transparent lacquer may provide a protective layer. This is because when the film 1 of FIG. 1A is fitted around a product, it is the base layer film 2 that will be in contact with the product, and the combined photothermic and design layer 3 will form the top layer of the film 1. The combined photothermic and design layer 3 of the film 1 of FIG. 1B may also be formed from a transparent lacquer. However, in contrast to the first embodiment, it is the combined photothermic and design layer 3 of this second embodiment that will come into contact with a product. Therefore, in addition to providing good UV absorption, this embodiment protects the combined photothermic and design layer against scratching. Alternatively, the combined photothermic and design layer 3 of the embodiments of FIGS. 1A and 1B may be comprise colored inks, for example, black and white inks, where these inks also have good UV absorption properties.

Figure 1C:
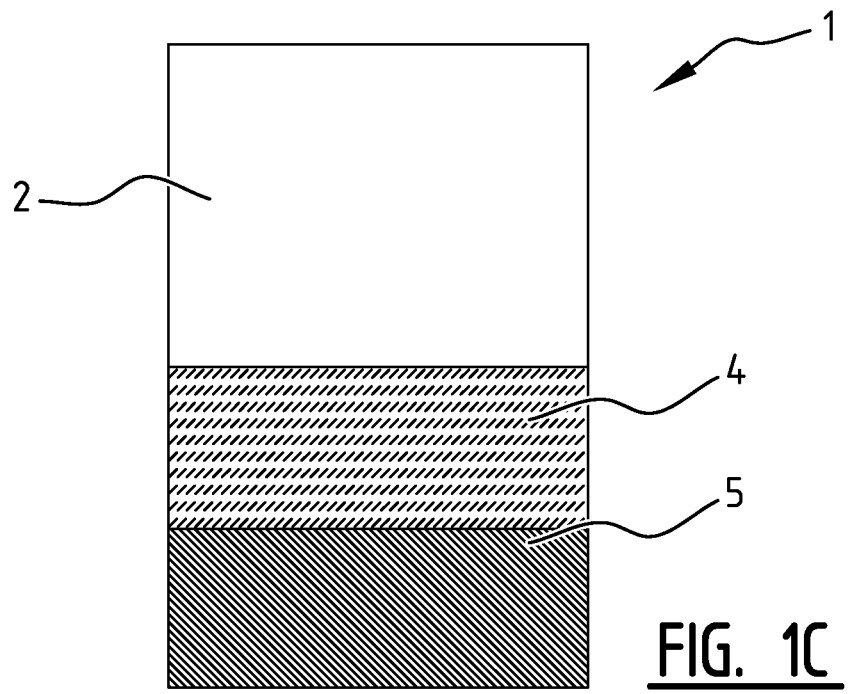
FIG. 1C is a schematic view of a cross-section through a third embodiment of a multi-layered film.
Figure 1D:
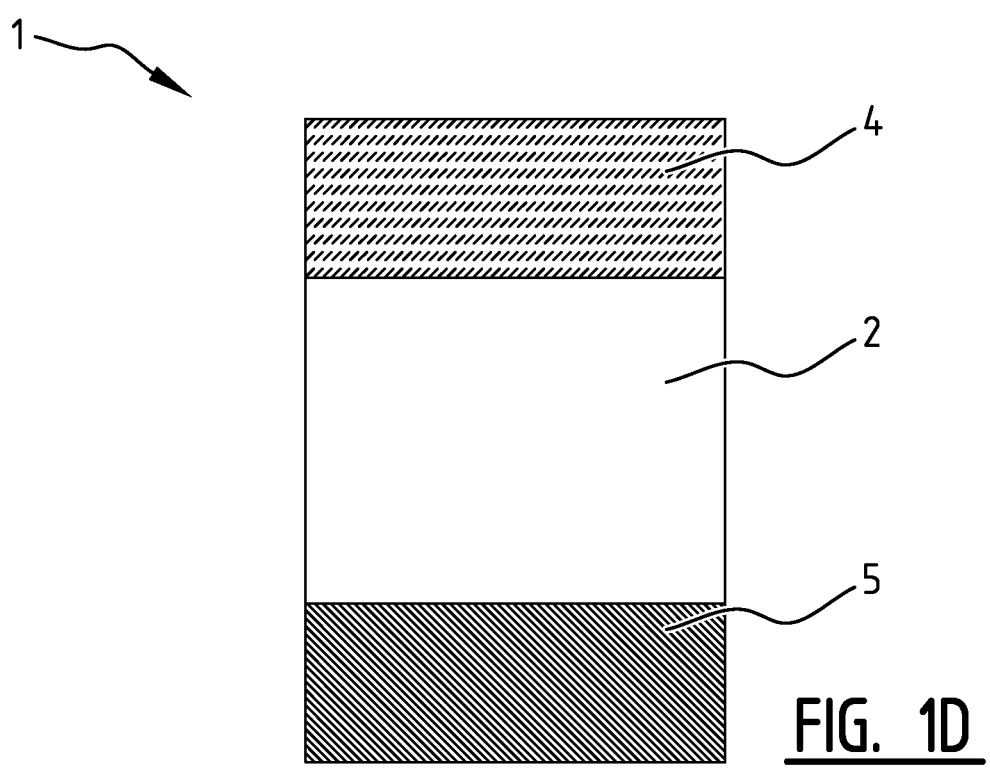
FIG. 1D is a schematic view of a cross-section through a fourth embodiment of a multi-layered film.

In FIGS. 1C-1F, the multi-layered film 1 comprises separate photothermic and design layers 4, 5. In the embodiment of FIG. 1C, the film 1 comprises a photothermic layer 4 arranged directly on the base layer film 2, and a separate design layer 5 arranged on the photothermic layer 4. In this embodiment, the photothermic layer 4 may comprise a transparent lacquer that has good UV absorption properties. The photothermic layer 4 may act as a binder between the base layer film 2 and the design layer 5. In the embodiment of FIG. 1D, the film 1 comprises a photothermic layer 4 arranged on the upper surface of the base layer film 2 and a design layer 5 arranged on the lower surface of the base layer film 2. In this embodiment, the photothermic layer 4 may once again be formed from a transparent lacquer that has good UV absorption properties. As the lacquer is provided on top of the base layer film 2, the photothermic layer 4 will form the outer layer of the film 1 and the lacquer may provide an additional protective coating for the film 1.

In the embodiments of FIGS. 1C and 1D, the design layer 5 forms the lowermost layer of the film 1. This means that both the photothermic layer 4 and the base layer film 2 should be transparent so that the design can be seen when it is viewed through both the photothermic and base layer film (4, 2).

Figure 1E:
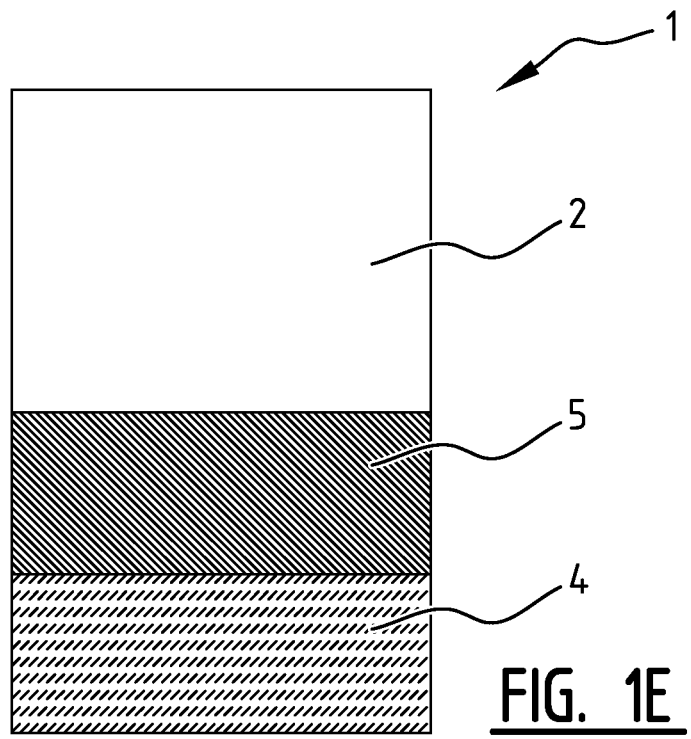
FIG. 1E is a schematic view of a cross-section through a fifth embodiment of a multi-layered film.

In all of the embodiments of FIGS. 1A to 1D, the layer comprising the photothermic material (either the photothermic layer 4 or the combined photothermic and design layer 3) is provided directly on the base layer film 2. In contrast, in the embodiments of FIGS. 1E and 1F, the photothermic material is provided in a photothermic layer 4 that is in indirect contact with the base layer film 2. In other words, in the embodiments of FIGS. 1E and 1F, the design layer 5 lies between the base layer film 2 and the photothermic layer 4. In FIG. 1E, the film 1 is provided with a base layer film 2 as the outmost layer. A design layer 5 is then provided on the lower surface of this base layer film 2, and a photothermic layer 4 is provided below the design layer 5. In this embodiment, the photothermic layer 4 could comprise a transparent lacquer or colored inks (such as black and white ink). Both the lacquer and the colored inks would have good UV absorption properties.

Figure 1F:
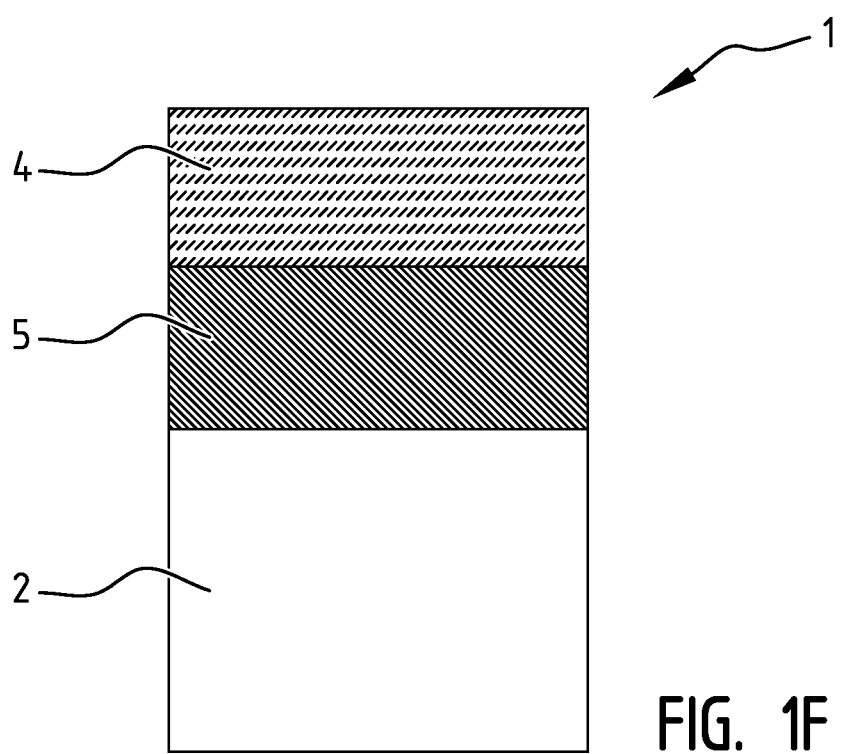
FIG. 1F is a schematic view of a cross-section through a sixth embodiment of a multi-layered film.

In the embodiment of FIG. 1F, the photothermic layer 4 and the design layer 5 are both provided on the upper surface of the base layer film 2. In particular, in this embodiment, the design layer 5 is sandwiched between the photothermic layer 4 and the base layer film 2. As the design layer 5 is positioned below the photothermic layer 4, the photothermic layer 4 must be transparent (for example, a transparent lacquer) or the design would not be visible.

As the photothermic layer 4 is provided on an exposed surface of the film 1 in FIG. 1F, this photothermic layer 4 can once again act as a protective layer. In the embodiments of FIGS. 1E and 1F, the photothermic layer 4 is protecting the design layer 5.

Figure 1G:
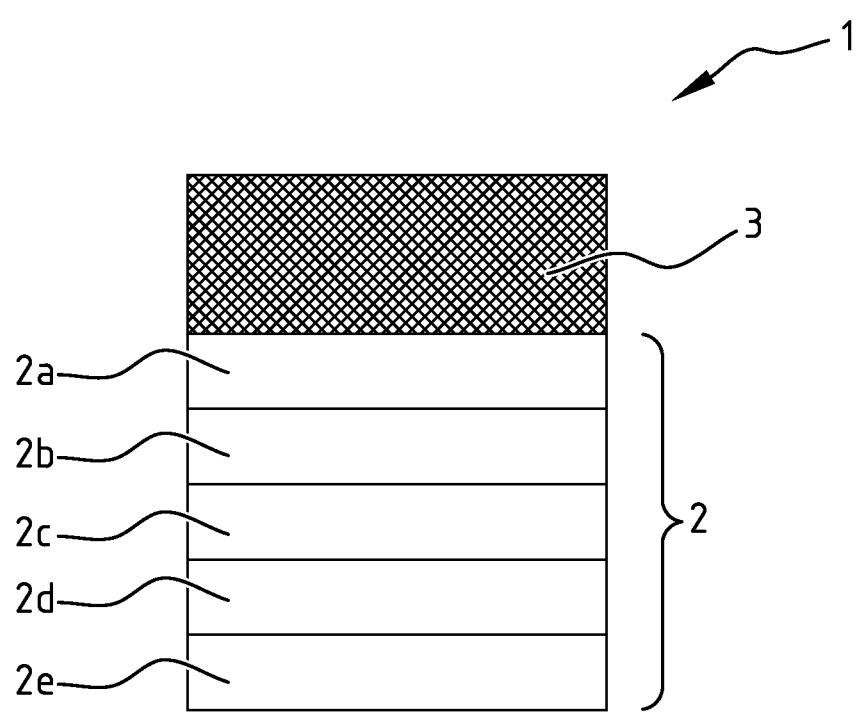
FIG. 1G is a schematic view of a cross-section through a seventh embodiment of a multi-layered film.

The embodiment of FIG. 1G comprises a film 1 comprising a combined photothermic and design layer 3 and a base layer film 2 comprising a multi-layered laminated film formed from five separate layers 2a, 2b, 2c, 2d, 2e. The multi-layered laminated film may have any number of layers, preferably three or five. The base layer film 2 comprising a multi-layered laminated film in the present embodiment comprises a core layer 2c of polystyrene (PS), two middle layers (2b, 2d) of a blend of polyethylene terephthalate (PET) and polystyrene (PET/PS), and two surface layers (2a, 2e) of polyethylene terephthalate (PET).

Figure 2A:
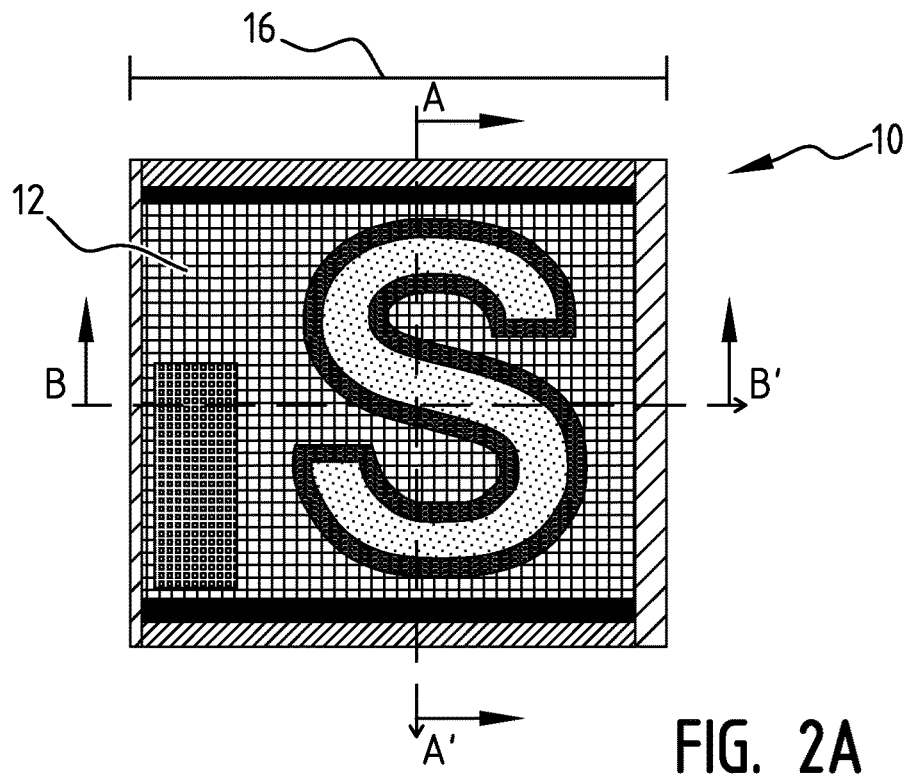
FIGS. 2A-2C are a front view and two cross-sectional views of an eighth embodiment of a multi-layered film of the present invention.
Figure 2B:
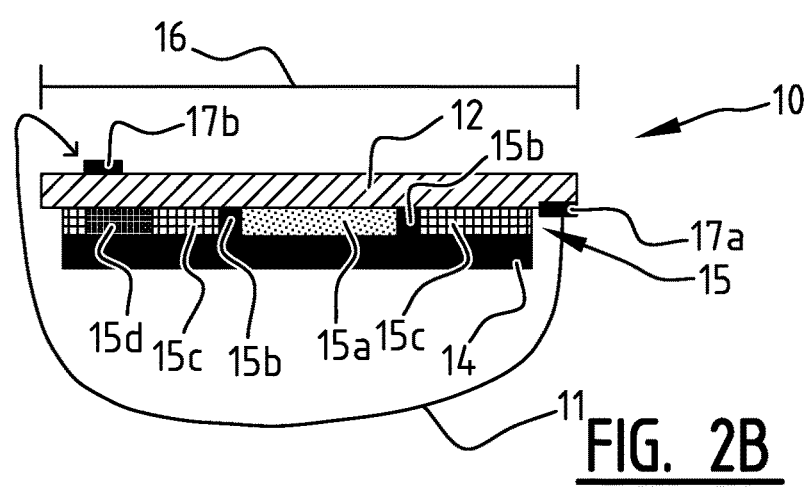
Figure 2C:
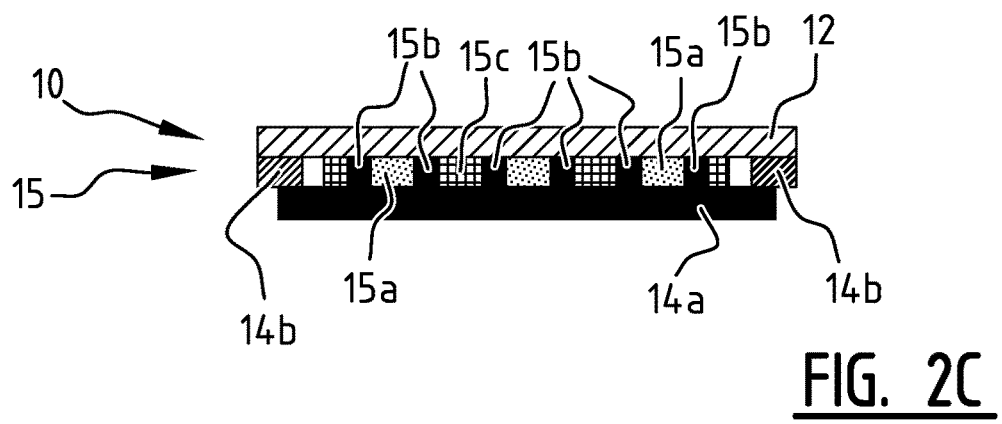

FIG. 2A shows a front view of a multi-layered film 10 provided with a design. As shown in FIGS. 2B and 2C, which respectively show a cross-section according to lines B-B' and A-A', the film 10 comprises a base layer film 12, a photothermic layer 14 and a design layer 15. The horizontal direction (B-B' direction) is the direction of main orientation. The photothermic layer 14 in this embodiment comprises a (white) ink composition 14*a* and a transparent lacquer composition 14*b* that includes a photothermic material, while the design layer 15 comprises a plurality of colored ink compositions comprising a pigment. The printed colored ink compositions (15*a*, 15*b*, 15*c*, ... ) together define the design as best shown in FIG. 2A. The UV absorption and shrinkage of each of the printed colored ink compositions (15*a*, 15*b*, 15*c*, ... ) are different depending on the used pigment in the printed colored ink compositions (15*a*, 15*b*, 15*c*, ... ). Even if the multi-layered film 10 is comprised of partial design layers (15*a, b, c*) including different pigments, the complete area covered and not covered by design layers 15 can be shrunk and will not show a substantial difference of shrinkage ratio, because the multi-layered film 10 has a photothermic layer 14 that covers the complete area of the base layer film 12. As shown in FIG. 2C, a top and bottom end of the film 10 has a transparent area comprising a photothermic layer formed by a transparent lacquer composition.

As shown in FIG. 2B, this photothermic layer 14 and the design layer 15 do not extend over the complete width 16 of the film 10 but leave some free area in which a seaming area 17*a* is applied for seaming in a next step. Seaming is performed by wrapping the film 10 around a product such that one end section (seaming area 17*a*) of the film 10 that is, for the purpose, provided with solvent or adhesive is brought in contact with another seaming area 17*b* at another end of the film 10, in accordance with arrow 11 and both seaming areas (17*a*, 17*b*) pressed against each other to provide the seam. It is noted that the seaming area 17 (17*a*, 17*b*) and the arrow 11 are shown to explain the relationship to the next step, but are not part of the cross-section of FIG. 2B. The arrangement shown makes it clear that shrinkage of the seaming area 17*a* can occur since a photothermic layer 14 is present in area 17*b*, even though the seaming area 17*a* is substantially free of photothermic material.

Figure 3:
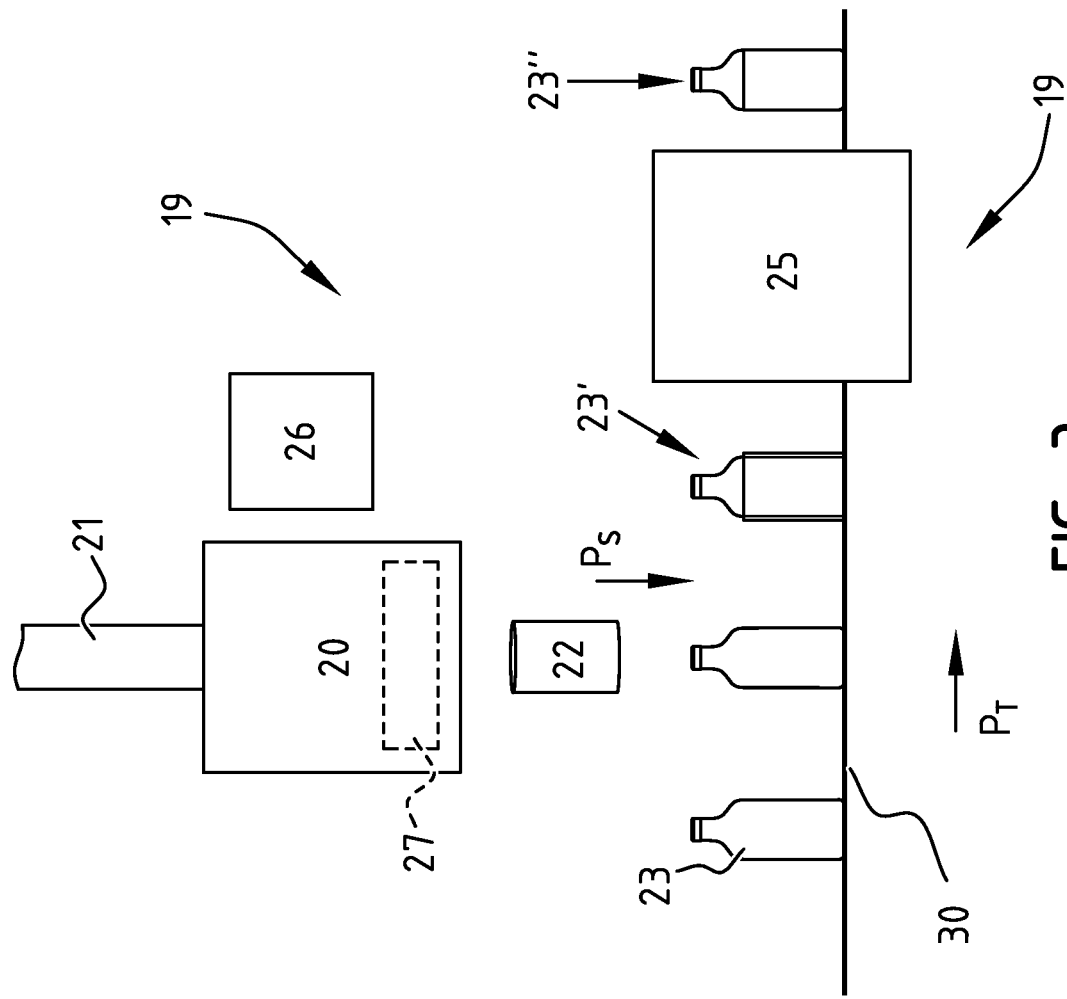
FIG. 3 is a schematic side view of an attachment system according to an embodiment of the present invention.

FIG. 3 shows schematically an attachment system 19 configured to attach sleeve-shaped labels 22 on a number of products 23. The attachment system 19 comprises a conveyor 30, for instance an endless belt conveyor wherein the product 23 may be carried on a belt. Tubular foil material 21, for instance a multi-layer material as described herein, is supplied and passed through a sleeving device 20. The sleeving device 20 is configured to open the tubular foil 21, cut the tubular foil 21 at a right length to generate the sleeve-shaped label 22 and to eject the sleeve-shaped label 22 in the direction of $P_S$ towards a container or product 23 that is being transported in transport direction $P_T$ on the conveyor 30. Once the sleeve-shaped label 22 has been arranged around the product 23, the label 22 is loosely wrapped around the product (see product 23' in FIG. 3) and the product 23' is transported further towards an attachment apparatus 25. The attachment apparatus 25 comprises an irradiation volume into which one or more consecutive products may be placed and in which the labels may be attached to the products by a suitable illumination of the label. The attachment apparatus 25 is configured to allow the sleeve to be firmly attached at the right position to the product 23' in order to provide a sleeved product 23" (FIG. 3).

Examples of a sleeving device 20 for applying a sleeve-shaped label 22 on a moving product 23 are given in WO 2013/073938 A1 in case of a downsleeving machine and WO 2014/006033 A1 in case of an upsleeving machine. The description of the sleeving system in either of these documents is herein incorporated by reference. In the sleeving systems of WO 2013/073938 A1 and WO 2014/006033 A1 the sleeve that has been arranged around the moving product, is shrunk in an oven wherein the shrinkable material of the label is heated up, for instance by guiding the product along a number of vapor nozzles. In the attachment system 19 of FIG. 3, however, the oven is replaced by the attachment apparatus 25. This attachment apparatus 25 is configured to generate electromagnetic radiation, especially ultraviolet (UV) light, which UV light is irradiated onto the label on the product inside the attachment apparatus 25 so that the photothermic material in the label is heated up and the shrinkable material of the label is caused to shrink the label around the product.

The attachment system 19 may optionally comprise a preheating unit 27, for instance integrated with the sleeving device 20 or embodied as a separate device placed between the sleeving device 20 and the attachment apparatus 25. The preheating unit 27 is configured to heat up the label material before the irradiation with UV light, wherein the preheating unit 27 is preferably configured to heat the label material to a temperature of 40-90 degrees Celsius, preferably 50-70 degrees Celsius.

The attachment apparatus 25, preferably also the sleeving device 20, the conveyor 30 and/or the preheating unit 27, are connected to a controller 26. The controller 26 may be configured to control the UV-light emitters to irradiate the one or more shrinkable labels 22 arranged on the one or more products 23 in the above-mentioned irradiation volume in order for the photothermic material to heat up causing the heat shrinkable material to shrink around the one or more products.

Figure 4:
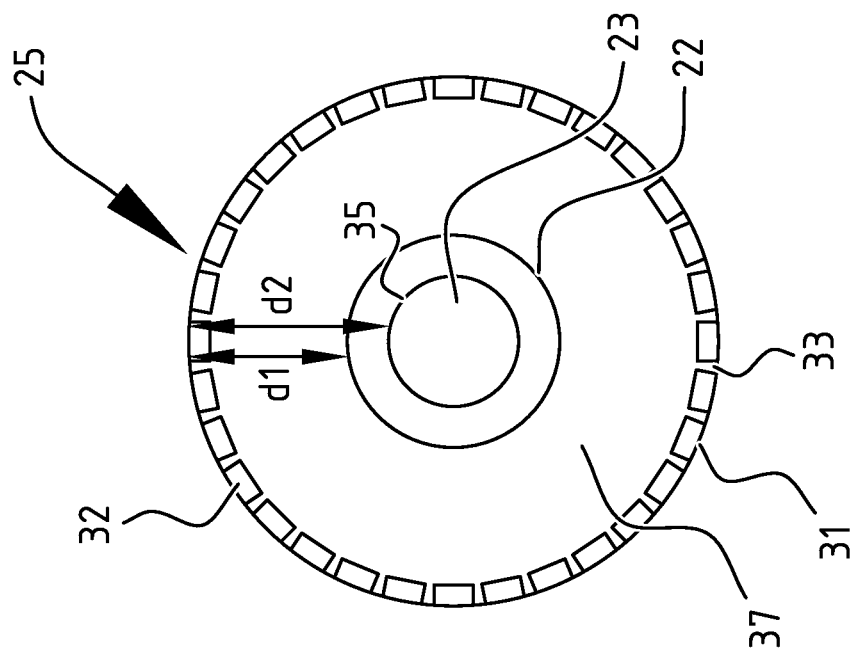
FIG. 4 is a schematic view of a cross-section of an embodiment of an attachment apparatus according to the present invention.

In FIG. 4 an embodiment of an attachment apparatus 25 for irradiating a product 23 with UV light is displayed. The figure shows an embodiment of an attachment apparatus 25 comprising an emitter support formed by a tubular frame 31 at the curved inner surface 33 of which a number of elongated strips 32 of UV light emitters have been positioned. Inside the tubular frame 32 an irradiation volume 37 is defined and the product 23 is moved into (and out of) this irradiation volume 37 by a suitable conveyor (not shown). When the product 23 has an elongated shape, for instance a bottle, the product 23 may be placed inside the radiation volume 37 in such a way that the product 23 is placed coaxially with respect to the tubular frame 31. In this situation any light emitters in the frame 31 can illuminate the outer surface of the product 23 substantially transversely of the label surface. In case the product 23 is arranged to be coaxial with the axial direction of the tubular frame 31, the distance between each of the light emitters in the tubular frame 32 and the outer surface 35 of the product 23 may be maintained generally constant.

Each of the strips 32 of UV light emitters may be formed by a carrier on which a plurality of LED emitters have been mounted. In a particular embodiment the strip 32 is a LED strip (also known as an LED tape or ribbon light) comprising a flexible circuit board populated by surface mounted light-emitting diodes (SMD LEDs). The LED light emitters are connected to a common driver that drives the LED emitters at a suitable voltage.

In the embodiment of FIG. 4 the strips 32 are positioned at evenly distributed positions around the perimeter of the tubular frame 31 so that the light emitters of the strips 32 can illuminate the product 23 in an essentially uniform manner. Arranged around the outer surface 35 of the product 23 is a multi-layered sleeve-shaped label 22. In the schematic drawing the space between the inner surface of the label 22 and the outer surface 35 of the product 23 is exaggerated for a clear understanding of the drawings, but in practical situations this space will be much smaller. This means that the distance ($d_2$) between the emitters and the outer surface 35 of the product 23 is slightly larger than the distance ($d_1$) between the emitters and the label 22.

FIGS. 5A-5D show several possible arrangements of the strips 32 of UV lights arranged at the inner curved surface 33 of the tubular frame 31. In FIG. 5A each strip 32 (herein also referred to as each column) is composed of a large number of areas each comprising one UV-LED emitter 36. The UV-LED emitters 36 are arranged on a common substrate. The height (a) of each of the UV-LED emitter 36 is about 5 mm, while the width (b) has about the same size. The mutual distance (c) between the strips 32 of UV-light emitters 36 varies between the patterns shown in FIGS. 5A-5D. Whereas the embodiment of FIG. 5A has a number of strips 32 of UV-LED emitters 36 wherein the strips 32 are arranged side by side with little mutual space (small distance c) between them, in other embodiments the strips 32 are only distributed at certain discrete areas around the inner surface 33 of the tubular frame 31 (larger distance c). Table 1 shows an overview of the distances in the embodiments of FIGS. 5A-5D, wherein the embodiment of FIG. 5A has the most UV emitters while the embodiment of FIG. 5D has the fewest emitters.

TABLE 1

| Embodiment of FIG.: | a [mm] | b [mm] | c [mm] |
| --- | --- | --- | --- |
| 5A | 5 | 5 | 0 |
| 5B | 5 | 5 | 15 |
| 5C | 5 | 5 | 35 |
| 5D | 5 | 5 | 45 |

Depending on several parameters, such as the distance $d_1$ between the label 22 and the UV emitters, the light capacity of each of the emitters, the photothermic material properties of the label etc., the number of emitters for properly attaching a label 22 to a product 23 can vary.

In embodiments the distribution of the light emitters is such that there is no area wherein the provided light distribution has an intensity of less than 550 mW. If, for instance, light emitters are of the type NVSU233A 385 nm (LED produced by NICHIA) providing a specified light intensity, then it can be determined that the clearance between neighboring columns of UV light emitters should be less than eight times the width of the strip.

In the embodiment of FIG. 5A the clearance between neighboring columns of light emitters is small (for instance, close to zero) so that a very high and uniform light distribution may be achieved. However, the amount of heat generated by the UV emitters in this arrangement might cause problems inside the irradiation volume 37, which may cause reduction of the lifetime of the UV emitters (for instance, the LED UV emitters). The embodiment of FIG. 5D has a considerably lower light intensity on the label 22 and the light is slightly less evenly distributed, but the amount of heat generated by illuminating the product is reduced.

The emitter support, more specifically the frame 31, on which the light emitters 36 are mounted, may be in the shape of a tubular arrangement, such as the arrangement of FIG. 4. However, in other embodiments the emitter support is such that a (straight or arched) wall-like structure can be obtained. In this embodiment the wall of UV emitters 36 can be placed parallel to and close to either side of the trajectory of the products 23 on the conveyor 30. Similarly, a second wall of UV emitters 36 may be arranged at the opposite side of the trajectory, also in a direction generally parallel to the transport direction of the product 23. In this manner the product 23 may be illuminated from both sides (seen in transport direction from the left and right side) so that the label 22 on the products 23 moving pass the UV emitters 36 are illuminated during transportation.

Figure 6:
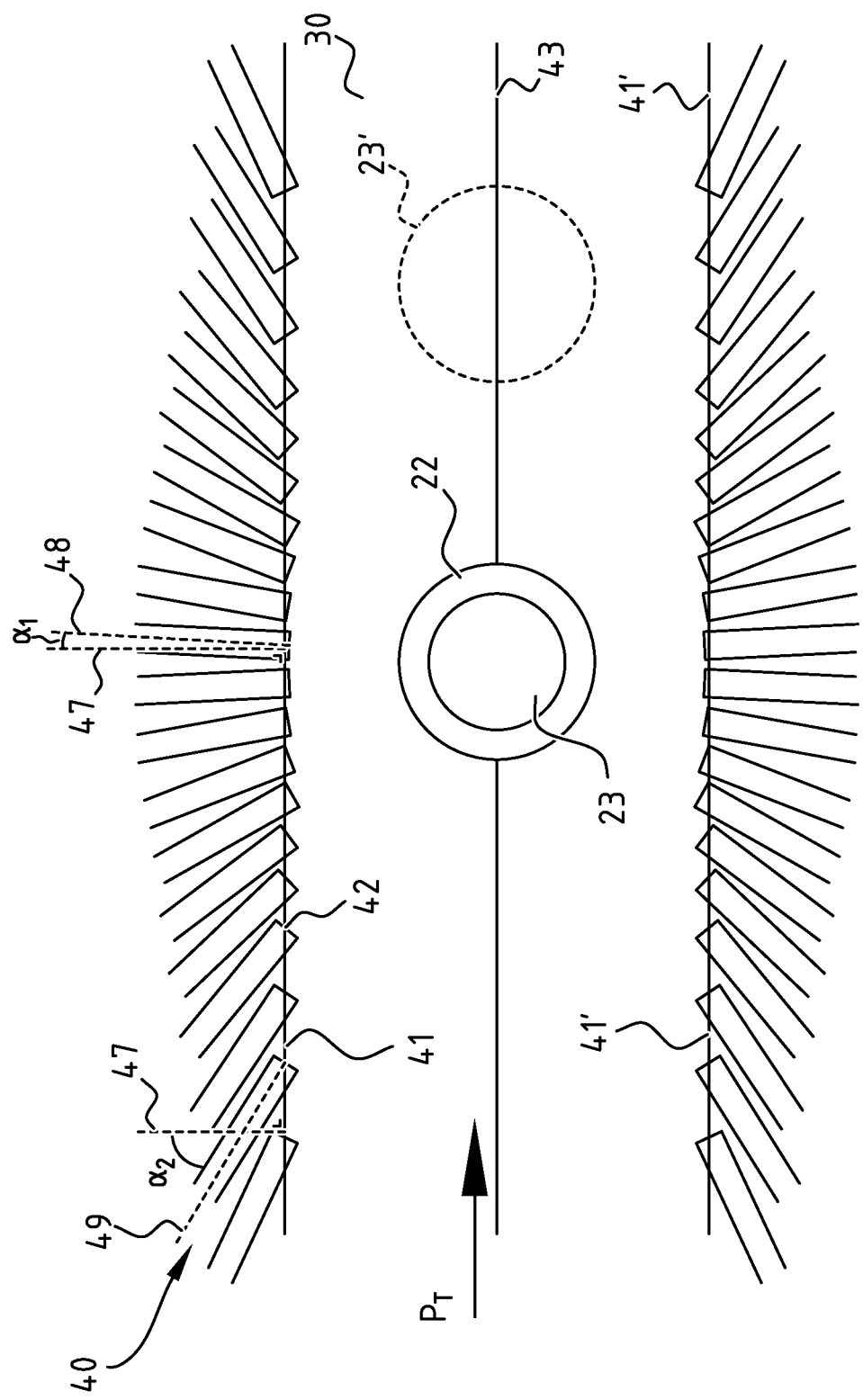

FIGS. 6-9 show further embodiments of the attachment apparatus 25 according to the present disclosure, wherein the light emitters have been positioned in wall-type arrangements. Referring to FIG. 6, the LED type UV light emitters 42 may be mounted to a wall-like frame or emitter support 41 (herein also referred to as a wall support). The emitters 42 have been mounted such that their light exit surfaces extend more or less in a flat plane, in this case parallel to the transport direction PT of the products 23,23'. In the shown embodiment, one product 23 is arranged in the irradiation volume on the belt of the conveyor 30 in order to transport the product 23 along a trajectory 43 that extends exactly in the middle between the wall support 41 at the first side of the conveyor 30 and the second wall support 41' at the opposite side. In the figure the product 30 at two different moments in time have been shown. Reference number 23 refers to the product when in the center of the irradiation volume (and therefore in the right irradiation area) and when the product is being irradiated, while reference number 23' refers to the product in a later stage when it has been transported in downstream direction. The irradiation of the product 23' at the downstream transported position may already have been completed and the label may already been shrunk on the product. However, other cases the product 23' in the downstream transported position may still be irradiated to finish the attachment operation.

While in the figure the presence of only one product 23 has been shown, in other embodiments the number of products inside the irradiation volume may be two, three or more. More than one product inside the irradiation volume can then be illuminated at the same time. The product(s) 23 can be illuminated when the conveyor 30 is stopped (for instance in case of an intermittent movement of the conveyor belt) or when the conveyor 30 moves the product(s) 23 along.

In order to improve the uniformity of the illumination of the product 23, the light emitters 42 may be oriented so as to focus the emitted light at the position of the product 23 at the center of the apparatus (i.e. the position of the container 23 in FIG. 6). In other words, the angle $\alpha_1$ between a line 47 perpendicular to the wall support 41 and a line 48 parallel to the light emitting direction of a light emitter 42 to the product 23 is small, so that the light impinges essentially perpendicularly on the outer surface of label 22. The angle $\alpha_2$ between the line 47 perpendicular to the wall and line 49 parallel to the light emitting direction of the light emitter 42 at the proximal (or distal) end of the wall support 41 is substantially larger. Typically, $\alpha_1$ ranges between 0 and 5° while $\alpha_2$ is in the range of 45 to 80°.

Furthermore, in embodiments of the present disclosure, the intensity of the light emitted by the emitters 42 is essentially constant over the part of the wall support 41 facing the product 23. However, in other embodiments, the light intensity close to the proximal and distal ends of the wall support 41 are higher than at positions near the center of the wall support 41 as to further increase the uniformity of the light illumination across the label 22 and thereby the surface of the product 23.

Once the label 22 has been properly attached to the surface of the product 23 by illuminating the label 22 with a sufficient dose of light, the illumination may be stopped until the next product 23 arrives at the irradiation area.

Figure 7:
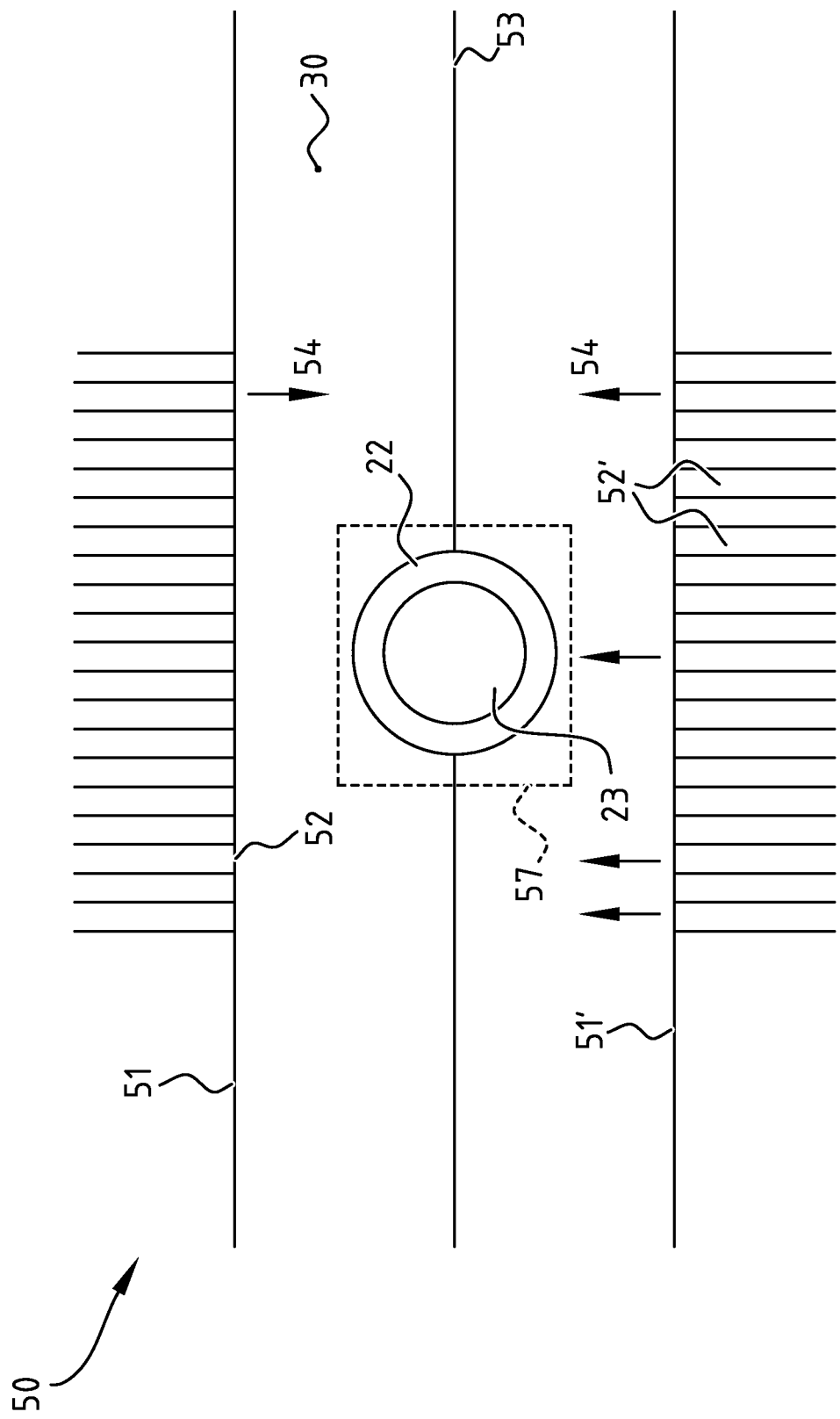

In FIG. 7 a similar wall arrangement of the light emitters is shown (wherein the angles $\alpha_1$ and $\alpha_2$ are (close to) zero). The figure shows an attachment apparatus 50 comprised of two straight wall supports 51, 51' arranged sideways of the center line 53 of the conveyor 30. The illumination area 57 is located midway between the wall supports 51, 51'. The light supports 51,51' are provided with a number of strips of LED-UV emitter devices 52 that are configured to emit a number of parallel UV light beams 54 towards the products 23 on the conveyor 30 (the light beams 54 generally being perpendicular to the transport direction). The light distribution across the surface of the label 22 is usually less uniform than the light distribution in the embodiment of FIG. 6, but for many applications uniform enough to attain acceptable attachment results.

Figure 8:
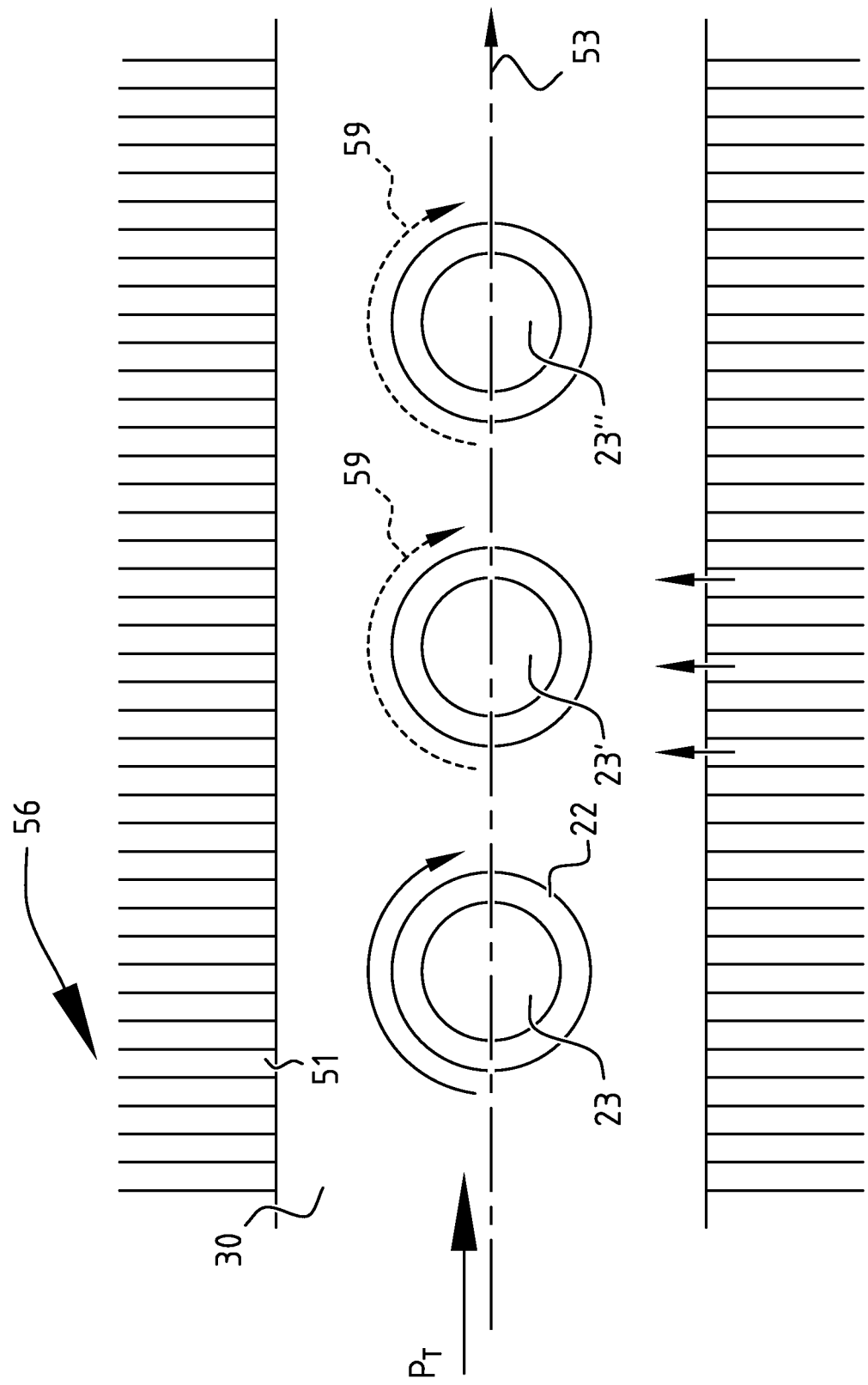

The embodiment of the attachment apparatus 56 of FIG. 8 corresponds to the embodiment of FIG. 7 with the exception of the total length of the emitter supports 51 and the fact that the products 23 can be rotated during the illumination period. Whereas the attachment apparatus 50 (FIG. 7) has a length that is suitable for irradiation only one product 23 at a time, the length of the attachment apparatus 56 (FIG. 8) is large enough to irradiate a plurality of products 23 at the same time. This may increase the throughput of the attachment apparatus 56. Furthermore, to increase the uniformity of the illumination, the products 23 may be placed on a rotation unit (not specifically shown) that enables the products 23 to rotate (for instance in direction 59, see FIG. 8) during their movement on the conveyor 30. In this manner, the light distribution across the entire surface of the label 23 may be made more uniform, so that the illumination interval and/or the light intensity provided by the light emitters (and thereby the amount of heat generated by the light illumination) can be reduced.

In the embodiments of FIGS. 6-8, the emitter support may be stable positioned on a bearing surface and may remain stationary during operation of the attachment apparatus. Also, the emitters are fixedly mounted to the emitter support so that the emitters are stationary (static) as well. In other embodiments, however, the emitter support may be made to move, for instance to move along with the movement of the product of the conveyor. Alternatively or additionally, the emitter support and the emitters may be stationary, but the light (beam) emitted by the emitters may be made movable. In a specific example the light may be caused to follow the movement of the product of the conveyor, by making use of a moveable lens or reflector (not shown). Whether the support, the emitters themselves or the lenses or reflectors of the emitters are movable (non-stationary) depends on the situation. Important here is that because of the movement of the support, lenses and/or reflectors, the light may be made to follow the movement of the product on the conveyor, for instance with a view to provide an even more uniform light distribution over the label. The movement is generally parallel with the movement of the product.

The embodiment of the attachment apparatus 45 shown in FIG. 9 corresponds to the embodiment earlier described in connection with FIG. 6 and the same reference numbers of attachment apparatus 40 of FIG. 6 have been used to refer to similar elements of the attachment apparatus 45 of FIG. 9. However, in the embodiment of FIG. 9, the emitter support 46,46' is mounted so as to be movable in the transport direction ($T_p$) during an illumination period of the product 23 and in the opposite direction between two illumination periods.

Figure 10A:
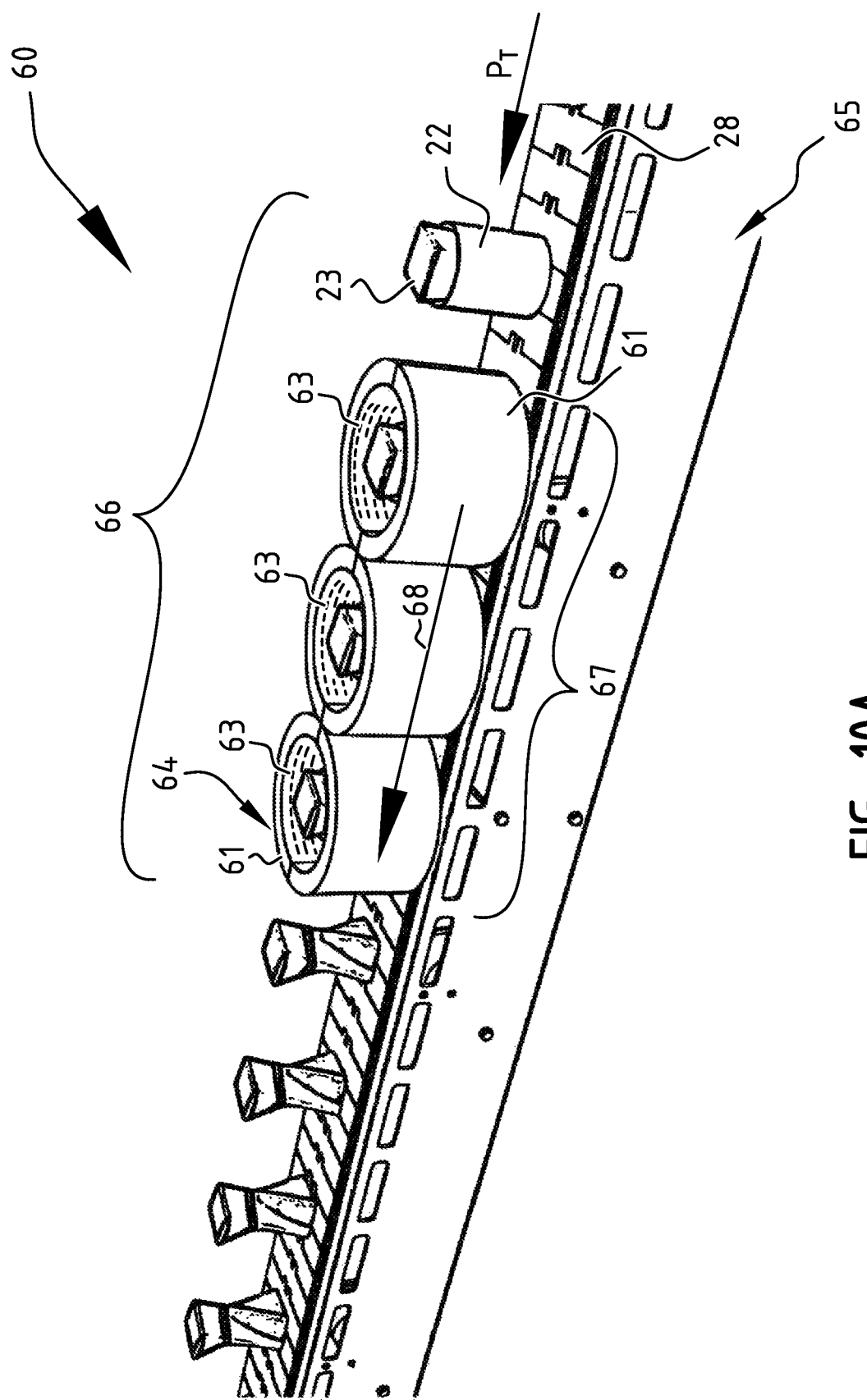

FIGS. 10A-10E show a further embodiment of an attachment apparatus 60 wherein the emitter support is made to move along with the movement of the product 23. FIG. 10A shows an attachment system 60 for attaching labels 22 that have been previously arranged around the outer surface of a row of products 23. The product 23 is transported on a conveyor 65. The conveyor 65 comprises an endless conveyor belt 28 that is driven to move the products 23 stably placed thereon in the transport direction (Pt). The attachment apparatus 60 comprises a first light emitter support 66 arranged at the right hand side of the conveyor 65 (seen in direction of transport Pt) and a second light emitter support 67 arranged at the left hand side of the conveyor 65. The first light emitter support 66 comprises three half-cup shaped elements (61), wherein the curved surface inside each of the elements and facing the products 23 is provided with a number of LED emitters 63. The first light emitter support 66 is mounted to a frame (not shown) in such a manner that the light emitter support may be moved by a drive mechanism (not shown) in a first direction 68 parallel to the trajectory of the products 23 (that is parallel to the transport direction Pt) and a second direction 69 (FIG. 10C) perpendicular to the trajectory of the products 23 on the conveyor 65 (that is perpendicular to the transport direction Pt).

Similarly, the second light emitter support 67 arranged on the opposite side of the conveyor 65 and essentially being identical to the first light emitter support 66 is arranged to illuminate the product 23 from the opposite side. Similar to the first light emitter support 66, the second light emitter support 67 comprises a number of half-cup shaped elements 61 that comprise a curved inner surface at which a number of rows and columns of light emitters 63 facing the illumination areas of the products 23 have been arranged.

In the shown embodiments, each of the light emitter supports 66, 67 comprises three half cup shaped elements 61. In other embodiments, the number of half cup shaped elements may differ, for instance from 1, 2, 4, 5 or more elements. The larger the number of cup shaped elements 61, the more products 23 can be illuminated at the same time so that the throughput of the attachment system 60 may be increased. The product 23 on the conveyor 65 can be transported in a continuous manner, i.e. without interruptions, or in an intermittent manner. In either case the light emitter supports 66, 67 are made to follow the movement (i.e. a continuous or intermittent movement) of the product 23 on the conveyor 65, as will be explained hereafter.

FIG. 10A shows the start position in which the first and second light emitter supports 66, 67 have been arranged such that an essentially cylindrical irradiation volume 64 defined by the curved surfaces of both the first and second light emitter supports 66, 67 is created. In a first step (step S100) the emitter supports 66,67 are moved along with the movement of the products 23 on the conveyor 65 in direction 68. In a second step (step S200) the light emitters 63 are switched on in order to illuminate the product 23 from essentially all radial directions. During the illumination, the first and second light emitter supports 66, 67 keep being moved in the first direction 68 along with the products 23 and preferably in a manner in which the movement of the products 23 on the conveyor 65 is not impeded or influenced. The movement in axial direction 68 of the first and second light emitter supports 66,67 may be fully synchronous with the movement of the products 23 carried by the conveyor 65.

Figure 10B:
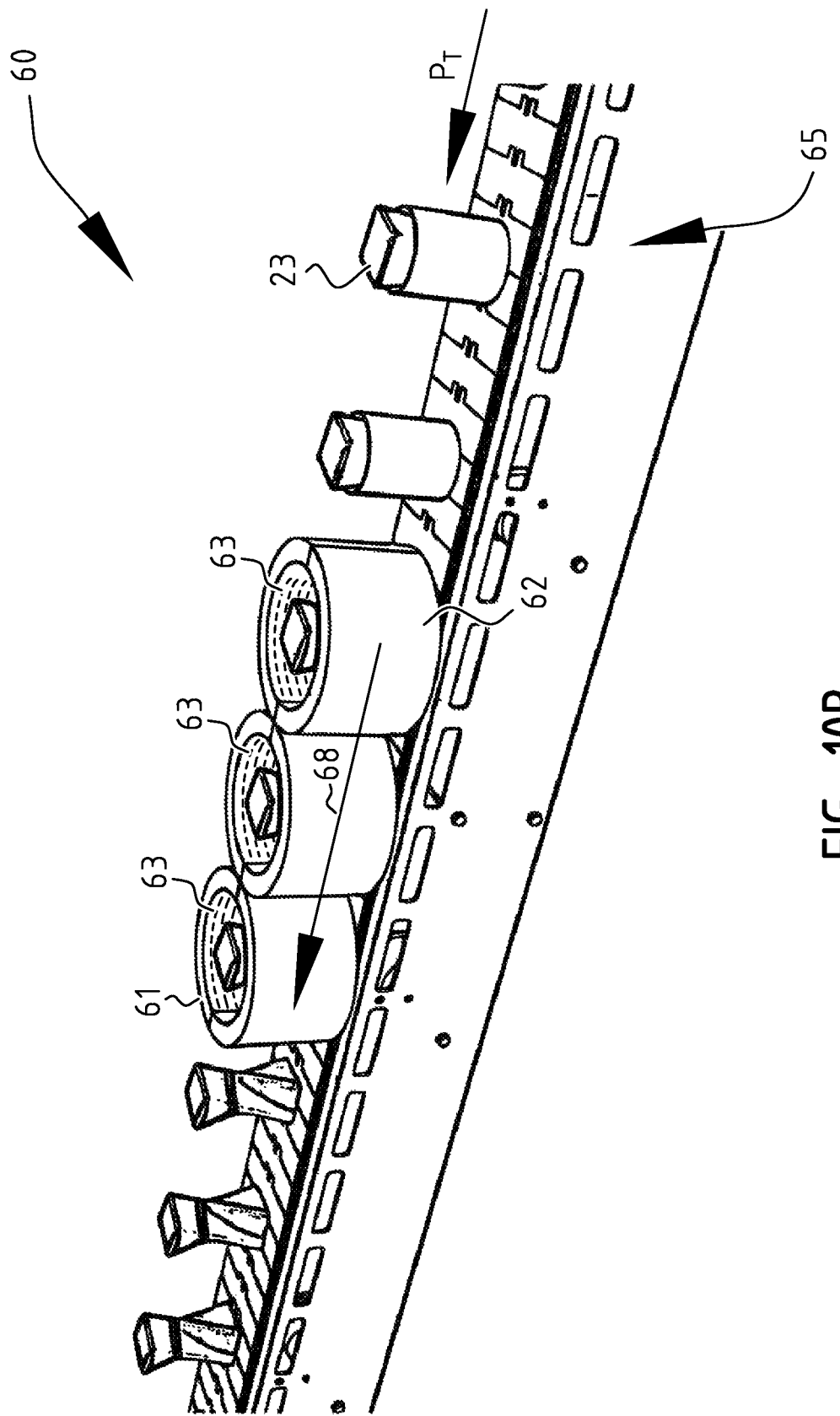
Figure 10C:
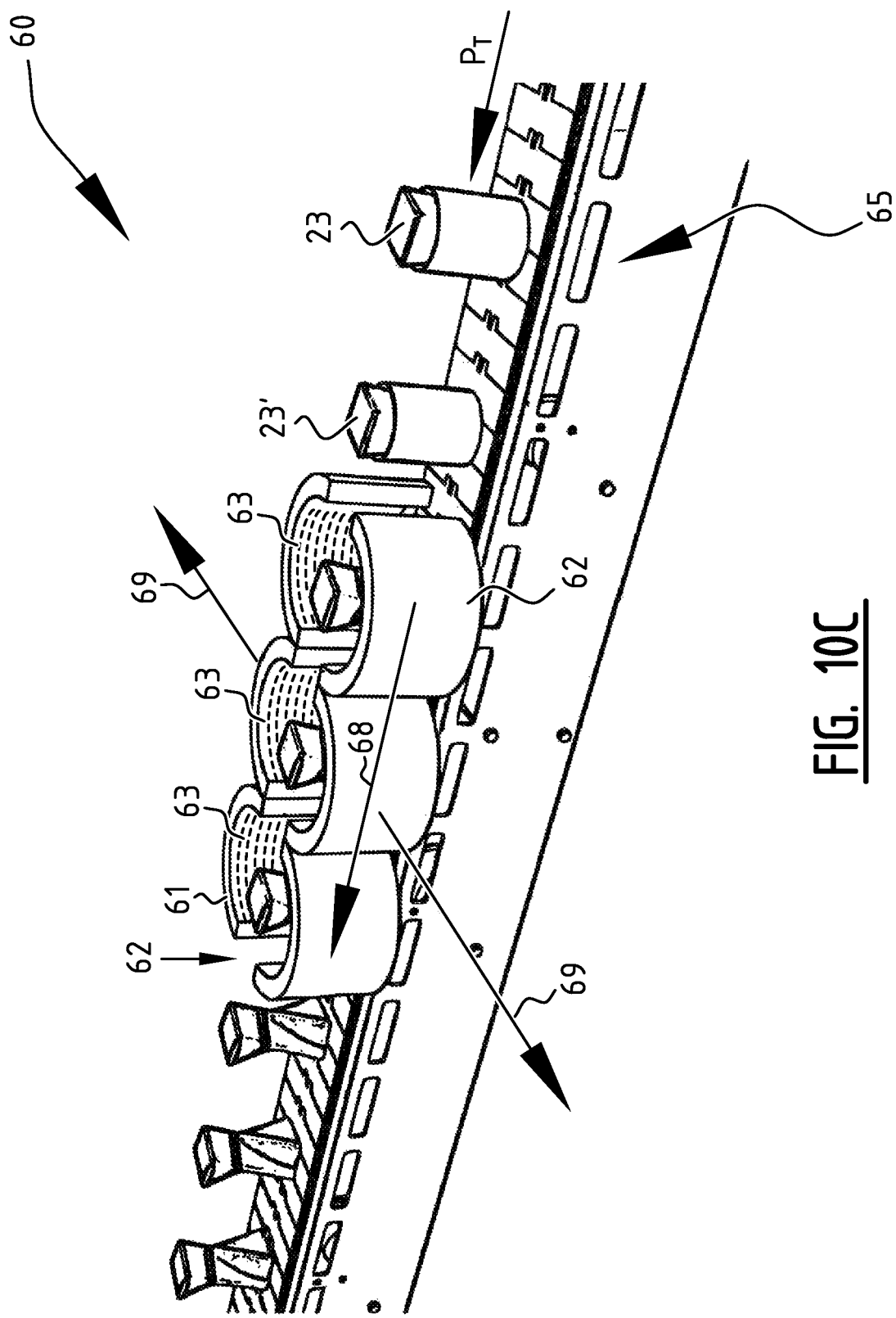
Figure 10D:
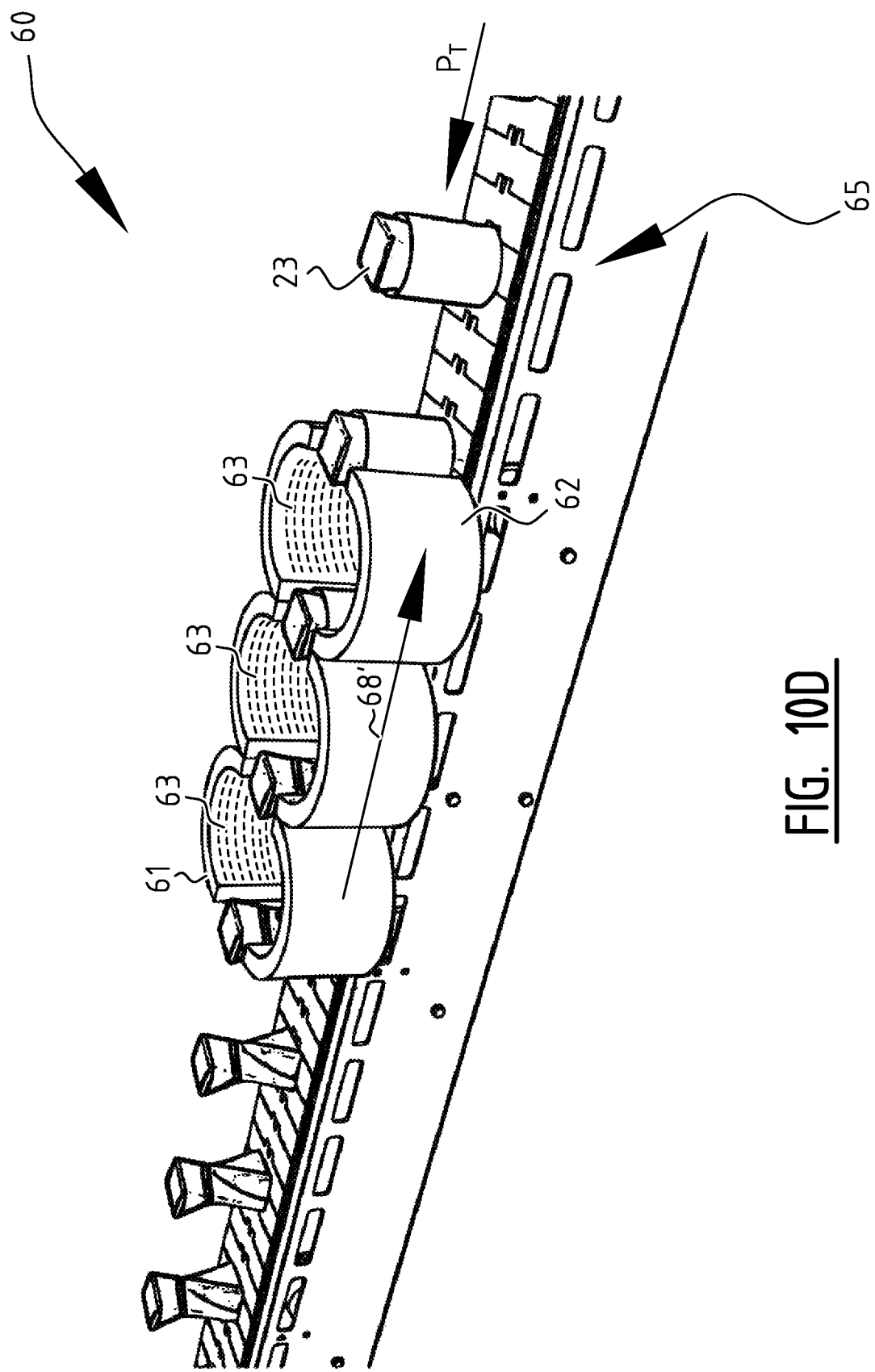
Figure 10E:
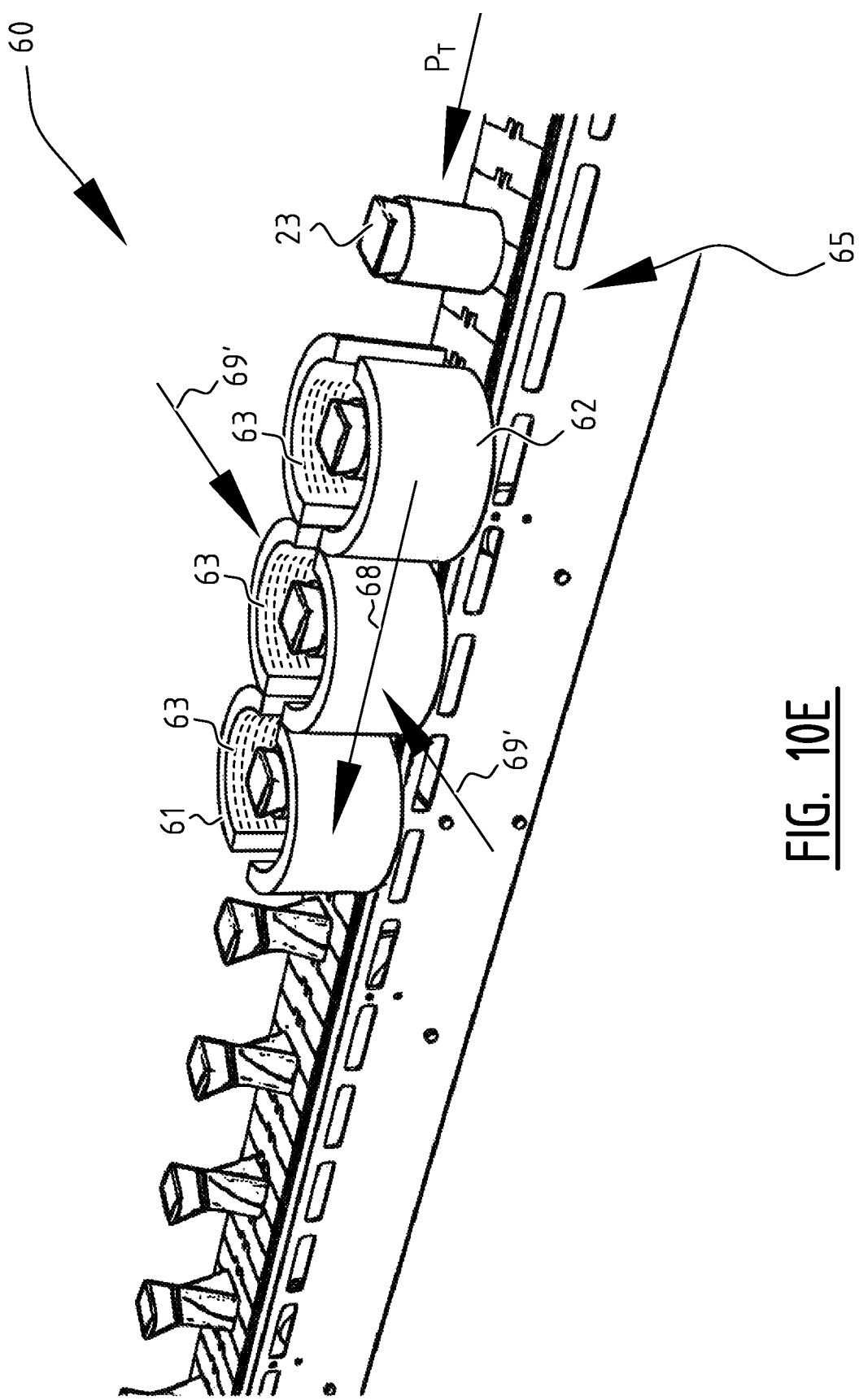

Once the label has been sufficiently illuminated causing the label 22 to be properly attached to the products 23 (in the shown embodiments the three products, but in other embodiments a larger or smaller number of products) and the light emitter supports 66, 67 have been arrived at the position shown in FIG. 10B, the light emitters are switched off (step S300) and the light emitter supports 66, 67 are moved in the second direction 69 (step S400). In other words, the light emitter supports 66,67 are moved away from each other in a direction perpendicular to the transport direction Pt of the products 23. In this manner, the irradiation volume 64 created by the light emitter supports 66, 67 is opened (FIG. 10C) such that a gap 62 between the outer ends of each of the half-cup shaped elements 61 is created enabling the products 23 to be move further and discharged from the conveyor 65. In a further step (step S500) the light emitter supports 66, 67 are moved backwards (direction 68' in FIG. 10D), back to the original start position. In a further step (step S600) the first and second light emitter supports 66, 67 are moved again in the first direction 69' (that is towards each other) once a new batch of products 23 has arrived (FIG. 10E) in order to close the irradiation volumes 64. The steps S100-S600 can now be repeated for a new batch of products 23.

Figure 11A:
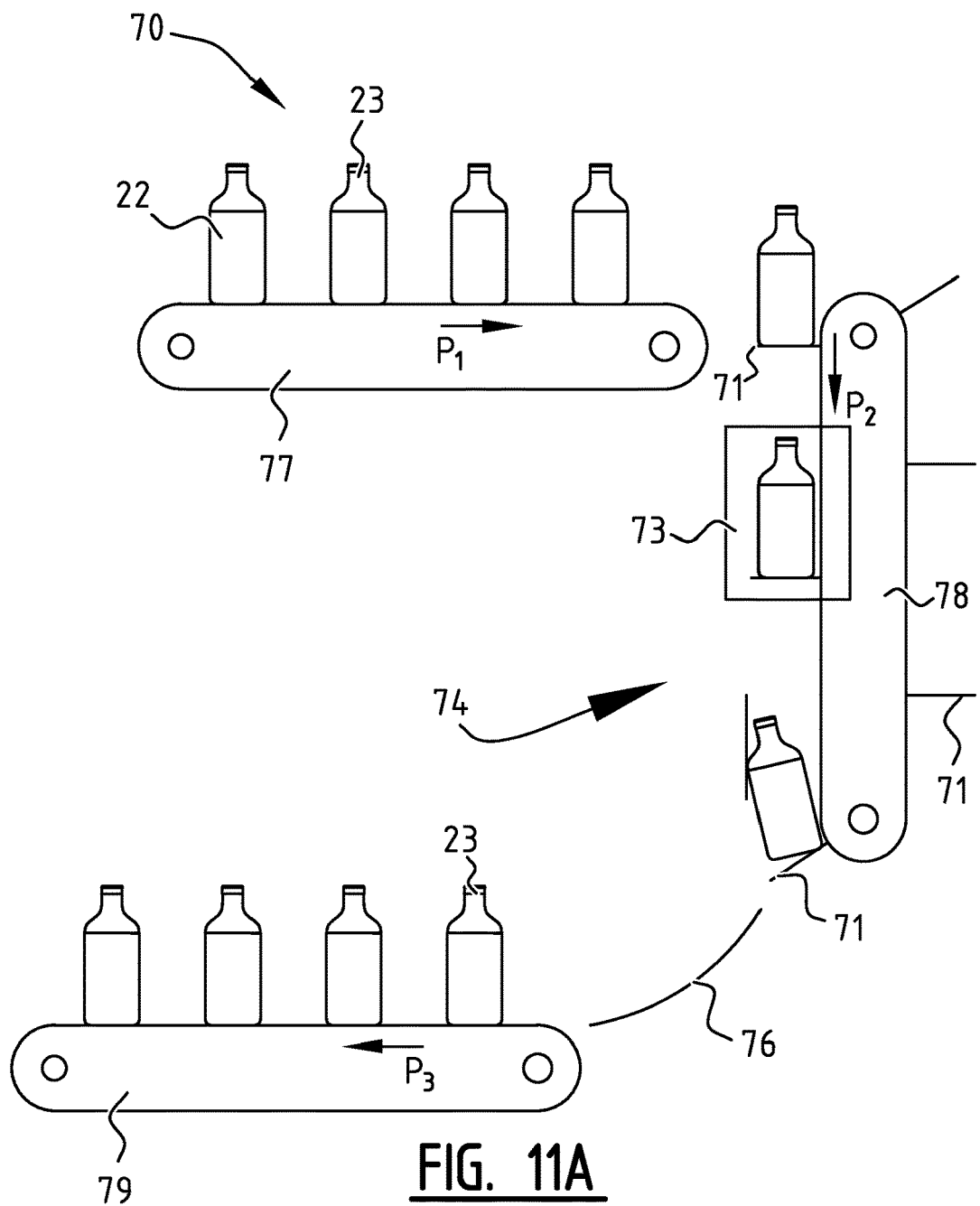
FIGS. 11A and 11B are a schematic side view and top view of a further embodiment of an attachment system.
Figure 11B:
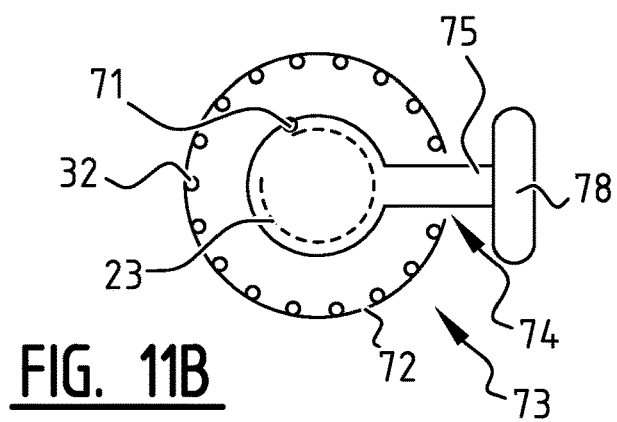

FIGS. 11A and 11B show a further embodiment of an attachment system 70 for attaching labels 22 to a number of products 23. The figures show an attachment system 70 comprising an attachment apparatus 73, a conveyor 78 for transporting the products 23 through the attachment apparatus 73 and a couple of further conveyors 77, 79. The supply conveyor 77 is configured to transport a number of products 23 that have previously been provided with sleeve-like labels 22 (in direction P$_1$). The sleeve-like labels 22 are arranged around the outer surface of the product 23 without actually attaching them. While the supply conveyor 77 is arranged to transport the product 23 in the generally horizontal direction, the second (attachment) conveyor 78 is configured to transport the product 23 in a generally vertical or at least a downward direction (P$_2$). Each product 23 is transferred from the first conveyor 77 by means not shown in the figure (for instance a robot) onto a support plate 71 attached to the (vertical) conveyor 78. Each of the support plates 71 is able to carry one (or more) products 23 and to move the products 23 through the irradiation volume of the attachment apparatus 73.

The attachment apparatus 73 may be of any type earlier described herein, for instance the embodiment discussed in connection with FIG. 4. The attachment apparatus 73 may for instance comprise a generally tubular irradiation volume in which the labelled product 23 can be positioned and then illuminated, so that the label 22 is properly attached to the product 23. In the top view of FIG. 11B is indicated that each of the support plates 71 is attached through means of a rod 75 to the conveyor 78. This cylindrical emitter support 72 of the attachment apparatus 73 is provided with a slit 74 that allows the passage of the rod 75 when the support plate 71 is moved through the irradiation volume of the attachment apparatus 73. Once the label 22 has been attached to the product 23 and the product 23 has left the attachment apparatus 73, the sleeved product 23 is caused to drop down from the conveyor 78 into a receptacle 76, for instance a chute, that transfers the received sleeved product 23 onto a discharge conveyor 79. The discharge conveyor 79 discharges the sleeved products 23 for further handling (in direction P$_3$).

In the shown embodiment, the emitter support 72 forming the irradiation volume is a stationary support. Attachment conveyor 78 is used to move the products 23 along this stationary support 12. In other embodiments (not shown) the emitter support 12 may be caused to move in upward and downward direction so as to temporarily follow the movement of each of the support plates 71. In this manner the irradiation time can be increased.

FIGS. 12A and 12B show a further embodiment of an attachment system 80. The figures show attachment system 80 comprised of an attachment apparatus 81, a supply conveyor 82 for supplying a number of products 23 (in a transport direction P$_T$), a discharge conveyor 83 for discharging the products 23 and a robot (only partly shown) arranged between the first and second conveyors 82,83 and configured to place a batch of products 23 in a light emitter support 84. More specifically, the robot comprises a support plate 85 on which a number of products 23 can be stably positioned. Products 23 have been previously provided with a sleeve-like label arranged loosely around the outer surface thereof. The robot then moves the products 23 on the support plate 85 in upward direction (direction 87) in order to move each of the products 23 in an irradiation volume 88 of the attachment apparatus 81.

The attachment apparatus 81 comprises an emitter support 84 in which a number of (i.e. three) cylindrical irradiation volumes 88 have been formed. The cylindrical irradiation volumes 88 are configured such as to allow a co-axial arrangement of the products 23 inside the volumes 88. In order to properly position the products 23 inside the volumes 88, the support plate 85 is comprised of three support parts 89 that are connected through respective rods 90 to a common plate element 91. The common plate element 91 is connected to the robot, so that the support plate parts 89 can be properly moved up or down (in a direction 87) to move the product 23 in and out the respective irradiation volumes 88. The curved surfaces inside each of the light emitter support 84 and facing the products are provided with a number of light emitters 92, for instance in a manner as described earlier.

Figure 13:
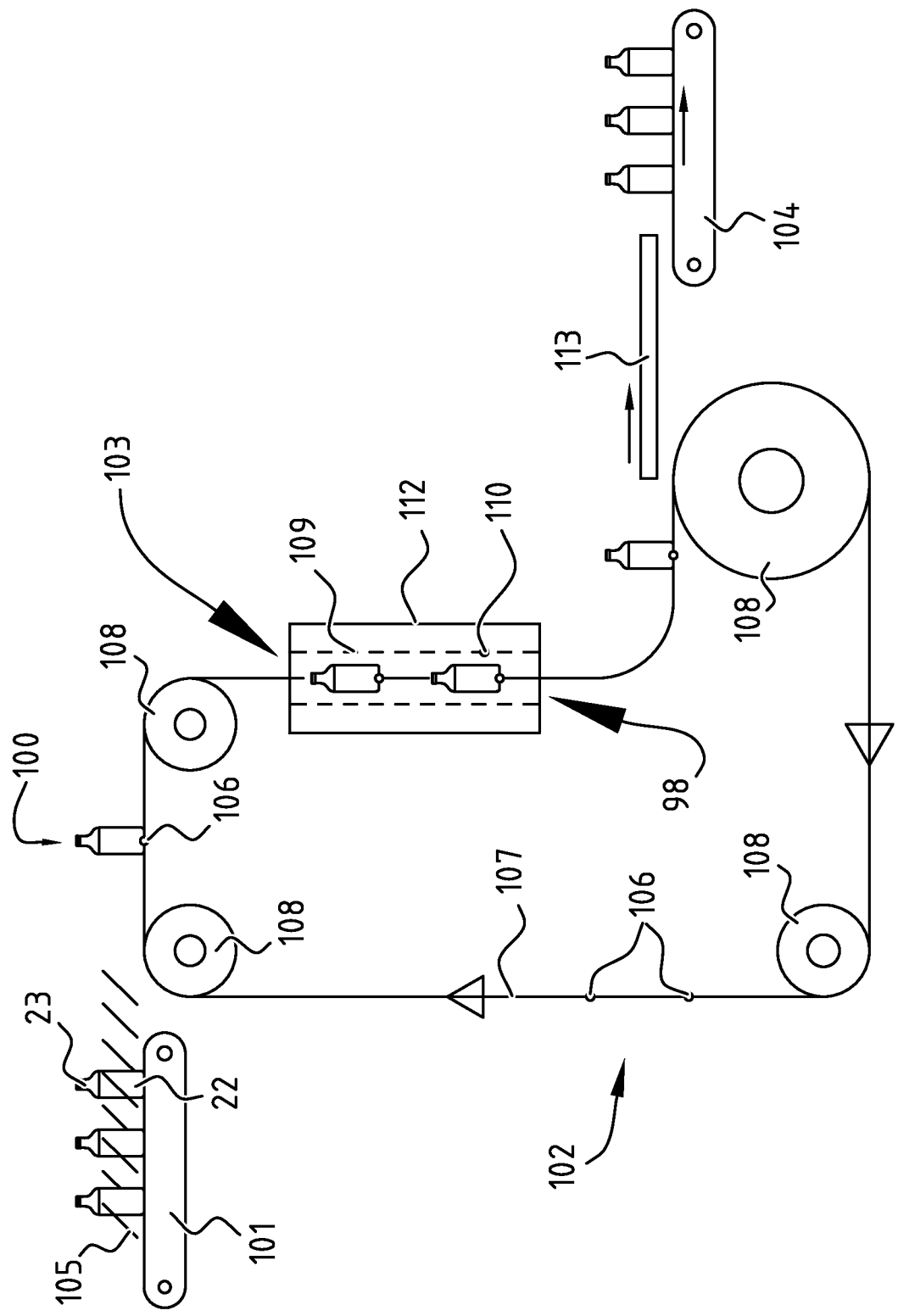
FIG. 13 is a schematic side view of still further embodiment of an attachment system.

FIG. 13 shows a further embodiment of an attachment system 100 for attaching a shrinkable label 22 on a product 23. The attachments system 100 comprises first (supply) conveyor 101, a second (attachment) conveyor 102 of the "paternoster" type, an attachment apparatus 103, and a third (discharge) conveyor 104. The second, Paternoster type conveyor 102 comprises a chain 107 that is arranged to move along a number of rolls 108 (wherein at least one of the rolls 108 is connected to a driving mechanism (not shown), for example an electric motor. The chain 107 is provided with a number of connection points 106 having a predefined pitch. The chain 107 forms a loop that enables the connection points 106 to be moved continuously without stopping, so that the connection points 106 can be transported along an attachment apparatus 103.

Placed on the first conveyor 101 is a number of products 23 on which sleeve-like labels 22 have been (loosely) arranged. For the products 23 to be transferred from the first conveyor 101 to the second conveyor 102, a screw structure 105 is provided that puts the products 23 on a pitch of the second conveyor 102. In other words, the screw 105 pushes each of the products 23 on one of the connection points 106 of the chain 107. The labels 22 can be applied not only on the first conveyor 101 but also on the second conveyor 102. It is preferable that the position where the labels 22 are applied is closer to the corner of the attachment apparatus 103 because the bottle carrying speed is smaller at the last minutes to change vertical movement.

The attachment apparatus 103 may be of the type, for instance of the type as described in connection with FIG. 4. In this case the products 23 can be transported inside a generally tubular irradiation volume 109 formed by the emitter support 112 of the attachment apparatus 103. The products 23 can be illuminated from almost all radial directions by the light emitters 110 provided on the inner surface of the emitter support 112. This means an even more evenly distributed light illumination of the labels 22 of the products 23 passing the attachment apparatus 103 may be achieved. Once the labels 22 have been properly attached to the products 23, the products 23 are transferred to the third conveyor 104, for instance, a conveyor of the earlier described endless belt type, and discharged for further handling. In order to help with the smooth transfer of the product 23 from the second conveyor 102 to the third conveyor 104, a number of upright transport belts 113, arranged sideways of the trajectory of the products 23, may be provided. The products 23 are pinched between two transport belts 113 until they have reached the third conveyor 104.

Figure 14:
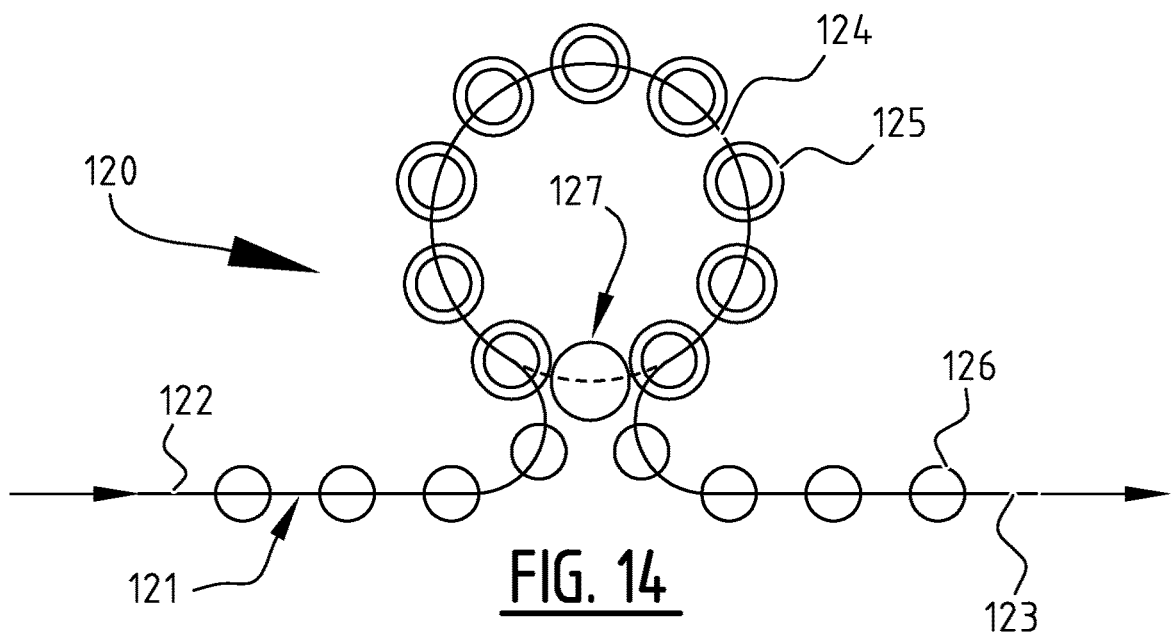
FIG. 14 is a schematic view of a further embodiment of an attachment apparatus wherein a carousel-type of conveyor is used to transport the products along a plurality of irradiation volumes.

Referring to FIG. 14 several further example embodiments of an attachment apparatus 120 are discussed. The figure shows a conveyor 121 comprising a generally linearly-shaped supply portion 122, a generally linearly-shaped discharge portion 123 and a generally ring shaped attachment portion 124. The conveyor 121 may be of any type capable of moving at least one row of products 126 along a number of UV light emitter supports 125 mounted at a stationary frame and arranged above and/or below the ring-shaped portion 124 of the conveyor 121. The conveyor 121 may be driven intermittently. In the time intervals wherein the conveyor 121 is stopped, the UV light emitter supports 125 may be moved upward and/or downward relative to the frame to place the UV light emitter supports 125 over a number of products 126. Alternatively or additionally, the products may be moved upward and/or downward relative to the UV light emitter supports (wherein the UV light emitter supports may be stationary during the upward or downward movement of the products or may move as well). Then the products 126 inside the UV light emitter supports 125 may be irradiated and the UV light emitter supports 125 may be moved (in the same or opposite directions) to remove the UV light emitter supports 125 from the products and/or the products may be moved relative to the UV light emitter supports to position the products outside the irradiation space of the UV light emitter supports. Then the conveyor 121 may start again to move the products to the discharge portion 123 of the conveyor. After irradiation of the products the UV light emitter supports 125 may be moved down- and/or upward again so that a further batch of products 121 may be irradiated.

In the above-described embodiments the UV light emitter supports 125 and products are movable relative to each other in upward and/or downward direction only, in the other directions they generally remain stationary. However, the UV light emitter supports 125 may also be mounted on a transporter 127 for transporting the UV light emitter supports 125 in lateral direction synchronously with the movement of the products 126 on the conveyor 121. The transporter 127 may be a carousel-type transporter as shown in FIG. 14. The carousel-type transporter 127 is capable of displacing the UV light emitter supports 125 in lateral direction and synchronously with the transport of the products 126 (which transport may be intermittently or continuous) on the conveyor 121. During the synchronous displacement the UV light emitter supports 125 and/or the products themselves may be moved up- and/or downward to position the UV light emitters supports around the products 126, the products 126 may then be irradiated and the UV light emitter supports 125 may be removed again so that the products 126 can be discharged. In this example embodiment the products 126 may be handled in a continuous manner (instead of the batchwise handling mentioned above).

Figure 15:
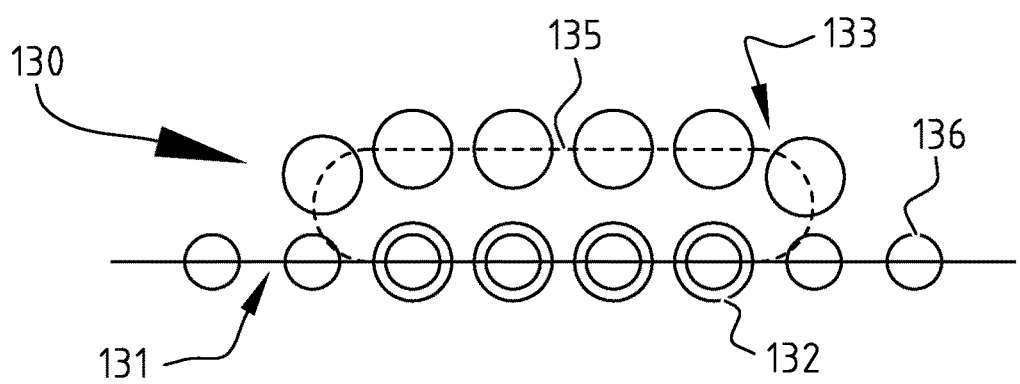
FIG. 15 is a schematic view of a further embodiment of an attachment apparatus wherein a carousel-type of transport mechanism is used to transport the irradiation volumes relative to products transported on a linear conveyor.

Referring to FIG. 15 a further example embodiment is discussed. In this embodiment the attachment apparatus 130 comprises a linear conveyor 131 (for instance, an endless transport belt) for transporting the products in a linear (straight) direction. The attachment apparatus 130 also comprises a number of UV light emitter supports 132 that are mounted on an endless transport mechanism 133. In the shown embodiment the endless transport mechanism 133 is a generally oval-shaped carousel-type of transporter. The same carousel-type transporter 135 as the transporter 127 described in FIG. 14 can be used in this embodiment and it is capable of displacing the UV light emitter supports 132 synchronously with the transport of the products 136 which transport intermittently or continuous on the conveyor 131. In an example embodiment the transporter 135 is embodied to have the UV light emitter supports 132 which go around in a slot shaped curve. During the synchronous displacement the UV light emitter supports 132 may be moved up- and/or downward to place them over the products 136. After irradiation of a products 136 an UV light emitter supports 132 may be moved down- and/or upward again and transported back to the position wherein the next product 136 may be irradiated.

Figure 16:
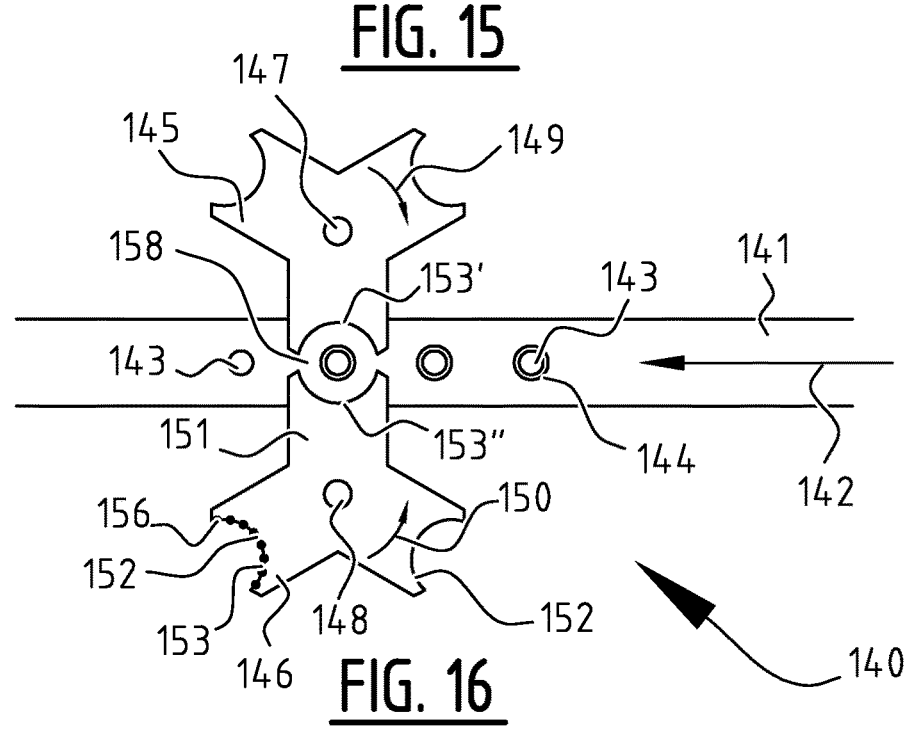
FIG. 16 is a schematic view of a further embodiment of an attachment apparatus wherein a plurality of irradiation volumes are positioned on number of rotating disks.

Referring to FIG. 16 a further example embodiment of the attachment apparatus 140 is described. The attachment apparatus 140 comprises rotatable UV light emitters supports 145,146 in the shape of two rotating disks positioned on opposite sides of a linear conveyor 141. The conveyor 141 may be of any type and is able to transport the products 143 (with the labels 144 loosely arranged the products 143) in transport direction 142 past the rotating disks. The UV light emitters supports 145, 146 are arranged to be rotatable relative to respective rotation axes 147, 148 extending perpendicularly to the transport direction 142. The rotating disks are driven by one or more drive units (not explicitly shown) to rotate synchronously with the movement of the products 143 on the conveyor 141. For instance, rotating disks may be driven in such a manner that the tangential speeds of the radial outer ends 152 of the rotating disks correspond to the speed of the products 143 on the conveyor 141.

As mentioned above each of the rotating disks comprises a number of radial outer ends 152 (in the shown embodiment the number is three, in other example embodiments the number may be one, two, four or more). Each of the outer ends 152 has a curved inner surface 153 at which a number of strips of UV light emitters 156 have been mounted (for an easy understanding of FIG. 16 these UV light emitters 156 have been shown on only one curved outer end 152). A pair of opposing curved inner surfaces 153',153" may form one irradiation volume 158 when they are moved to face each other. This situation is shown in FIG. 16. In this situation the UV light emitters of the opposing surfaces may irradiate the product 143 and label 144 essentially from all radial directions. The preceding merely illustrates the principles of the present invention. It will be appreciated that those skilled in the art will be able to device various arrangements, which, although not explicitly described or shown herein, embody the principles of the invention and are included within the scope of the appended claims.

The invention claimed is:

1. A method of attaching a shrinkable label on a product, wherein the shrinkable label comprises a multi-layered film comprising heat shrinkable material and photothermic material, the method comprising:
arranging the shrinkable label around the product and transporting the product on a conveyor, the product having an elongate shape along an axis;
arranging the product in an irradiation volume, the irradiation volume defined by a plurality of UV light emitters arranged on a first support and on a second support, the first support on a first side of the conveyor and the second support on a second side of the conveyor, wherein the first side differs from the second side, the plurality of UV light emitters arranged such that their light exit surfaces extend substantially in a flat plane parallel to a transport direction of the product, and at least a subset of the plurality of UV light emitters are angled to emit UV light having a focus at a center of the irradiation volume and in the direction of the shrinkable label arranged around the product; and
controlling the plurality of UV light emitters to irradiate the shrinkable label in order for the photothermic material to shrink around the product, wherein the UV light has a peak wavelength between 200 and 399 nm and at least 90% of the UV light is within a bandwidth of +/−30 nm of the peak wavelength, and wherein a UV light emitter of the plurality of UV light emitters includes a strip of emitters aligned substantially parallel to the product axis.

2. The method of claim 1, wherein the UV light emitters are arranged to direct UV light substantially transversely of the label surface.

3. The method of claim 1, wherein the plurality of UV light emitters at least partly surround the irradiation volume.

4. The method of claim 1, comprising transporting the at least one product on the conveyor and irradiating the at least one product while the at least one product is being transported by the conveyor.

5. The method of claim 1, wherein the UV light emitters have been arranged to focus UV light on a focus area.

6. The method of claim 1, wherein the plurality of UV light emitters includes a first UV light emitter and a second UV light emitter, and wherein the first UV light emitter is disposed at a position proximate the center and wherein the second UV light emitter is disposed at a position distal the center and further including a first angle between a first line perpendicular to the first support and a second line parallel to a light emitting direction of the first UV light emitter and including a second angle between the first line and a third line parallel to a light emitting direction of the second UV light emitter and wherein the second angle is substantially greater than the first angle.

7. The method of claim 6, wherein the first angle ranges between 0 and 5° and wherein the second angle ranges between 45 and 80°.

8. The method of claim 1, wherein the plurality of UV light emitters includes a first UV light emitter and a second UV light emitter, and wherein the first UV light emitter is disposed at a position proximate the center and wherein the second UV light emitter is disposed at a position distal the center and wherein light emitted from the first UV light emitter has a first intensity and wherein light emitted from the second UV light emitter has a second intensity and wherein the second intensity is greater than the first intensity.

9. An apparatus for attaching a shrinkable label on a product wherein the shrinkable label comprises a multi-layered film comprising heat shrinkable material and photothermic material, the apparatus comprising:
a plurality of UV light emitters including emitters arranged in strips;
a first UV light emitter support configured to support a first plurality of emitter strips of the plurality of UV light emitters on a first surface of the support;
a second UV light emitter support configured to support a second plurality of emitter strips of the plurality of UV light emitters on a second surface of the support;
the first UV light emitter support and the second UV light emitter support together shaped to form an irradiation volume in which the product can be aligned with a center of the irradiation volume, and wherein the plurality of UV light emitters are arranged such that their light exit surfaces extend substantially in a flat plane parallel to a transport direction of the product, and at least a subset of the plurality of UV light emitters are configured to focus UV light at the center of the irradiation volume; and
a controller configured to control the plurality of UV light emitters to irradiate the shrinkable label arranged on the product in the irradiation volume in order for the photothermic material to heat up causing the heat shrinkable material to shrink around the product, wherein the UV light emitters are configured to emit UV light having a peak wavelength between 200 and 399 nm and at least 90% of the UV light is within a bandwidth of between +/−30 nm of the peak wavelength.

10. The apparatus of claim 9, wherein neighboring strips of the first plurality of emitter strips or neighboring strips of the second plurality of emitter strips are separated by a distance between two times and eight times a width of the strips.

11. The apparatus of claim 9, wherein the first UV light emitter support and the second UV light emitter support are configured to support the plurality of UV light emitters in an arrangement that causes the plurality of UV light emitters to emit UV light in a direction transversely of a transport direction of the product.

12. The apparatus of claim 9, wherein the first UV light emitter support and the second UV light emitter support are configured to support the plurality of UV light emitters in an arrangement that causes the plurality of UV light emitters to focus UV light on a focus area.

13. The apparatus of claim 9, comprising a carousel-type of transporter, configured to transport the first UV light emitter support synchronously with movement of a conveyor on which the product may be transported.

14. The apparatus of claim 13, wherein the transporter is configured to arrange the first UV light emitter support over the product for irradiating the product.

15. A system for attaching a shrinkable label arranged on a product, wherein the shrinkable label comprises a multi-layered film comprising heat shrinkable material and photothermic material, the system comprising:
a plurality of UV light emitters including emitters arranged in strips;
at least one UV light emitter support configured to support the plurality of UV light emitters on a surface of the at least one UV light emitter support, the at least one UV light emitter support shaped to form an irradiation volume in which a product can be arranged at a center of the irradiation volume; and a controller configured to control the plurality of UV light emitters to irradiate the shrinkable label arranged on the product in the irradiation volume in order for the photothermic material to heat up causing the heat shrinkable material to shrink around the product, wherein the plurality of UV light emitters are arranged such that their light exit surfaces extend substantially in a flat plane parallel to a transport direction of the product, and at least a subset of the plurality of UV light emitters are configured to emit UV light focused at the center of the irradiation volume, the UV light having a peak wavelength between 200 and 399 nm and at least 90% of the UV light is within a bandwidth of between +/−30 nm of the peak wavelength, further comprising a conveyor configured to transport the product.

16. The system of claim 15, further comprising a sleeving device configured to apply a sleeve-shaped label around the product.

17. The system of claim 15, comprising a rotation unit configured to rotate the product when arranged in the irradiation volume.

18. The system of claim 17, wherein the rotation unit is configured to rotate the product during irradiation to expose essentially the entire outer surface of the label to the UV light from the plurality of UV light emitters.

19. A system for attaching a label arranged on a product, wherein the label includes a film of heat shrinkable material and a film of photothermic material, the system comprising:
a plurality of UV light emitters arranged in a plurality of strips, the plurality of UV light emitters including a first UV light emitter;
a plurality of UV light emitter supports, the plurality of UV light emitter supports including a first UV light emitter support and a second UV light emitter support, the plurality of UV light emitter supports configured to support the plurality of strips, wherein the plurality of UV light emitter supports form an irradiation volume;
a controller configured to control the plurality of UV light emitters to irradiate the label arranged on the product in the irradiation volume in order for the photothermic material to heat causing the heat shrinkable material to shrink around the product, wherein the plurality of UV light emitters are arranged such that their light exit surfaces extend substantially in a flat plane parallel to a transport direction of the product, and at least a subset of the plurality of UV light emitters are configured to emit UV light focused at the center of the irradiation volume, wherein the first UV light emitter is configured to emit UV light having a peak wavelength between 200 and 399 nm and at least 90% of the UV light is within a bandwidth of between +/−30 nm of the peak wavelength,
a conveyor configured to transport the product relative to the irradiation volume;
wherein the first UV light emitter support is arranged on a first side of the conveyor and the second UV light emitter support is arranged on a second side of the conveyor; and
wherein the plurality of strips includes a first strip neighboring a second strip and wherein a distance between the first strip and the second strip is between two times and eight times a width of the strips.

20. The system of claim 19, wherein the plurality of UV light emitters includes a second UV light emitter, and wherein the first UV light emitter is disposed at a position proximate the center of the irradiation volume and wherein the second UV light emitter is disposed at a position distal the center and further including a first angle between a first line perpendicular to the first UV light support and a second line parallel to a light emitting direction of the first UV light emitter and including a second angle between the first line and a third line parallel to a light emitting direction of the second UV light emitter and wherein the second angle is substantially greater than the first angle.

21. The system of claim 20, wherein the first angle ranges between 0 and 5° and wherein the second angle ranges between 45 and 80°.

22. The system of claim 19, wherein the plurality of UV light emitters includes a second UV light emitter, and wherein the first UV light emitter is disposed at a position proximate the center of the irradiation volume and wherein the second UV light emitter is disposed at a position distal the center and wherein light emitted from the first UV light emitter has a first intensity and wherein light emitted from the second UV light emitter has a second intensity and wherein the second intensity is greater than the first intensity.

* * * * *